United States Patent
Lee et al.

(10) Patent No.: US 11,286,610 B2
(45) Date of Patent: Mar. 29, 2022

(54) LAUNDRY MACHINE HAVING INDUCTION HEATER AND CONTROL METHOD OF THE SAME

(71) Applicant: LG Electronics Inc., Seoul (KR)

(72) Inventors: Youngjoo Lee, Seoul (KR); Sangwook Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 73 days.

(21) Appl. No.: 16/713,325

(22) Filed: Dec. 13, 2019

(65) Prior Publication Data

US 2020/0190725 A1 Jun. 18, 2020

(30) Foreign Application Priority Data

Dec. 13, 2018 (KR) .......................... 10-2018-0161336

(51) Int. Cl.
*D06F 39/04* (2006.01)
*D06F 34/28* (2020.01)
(Continued)

(52) U.S. Cl.
CPC .............. *D06F 39/04* (2013.01); *D06F 25/00* (2013.01); *D06F 33/00* (2013.01); *D06F 34/28* (2020.02);
(Continued)

(58) Field of Classification Search
None
See application file for complete search history.

(56) References Cited

U.S. PATENT DOCUMENTS 6,032,494 A * 3/2000 Tanigawa .............. D06F 35/006
68/12.06
2005/0188471 A1* 9/2005 Ahn ........................ D06F 58/38
8/158
(Continued)

FOREIGN PATENT DOCUMENTS

EP 3375930 9/2018
KR 100562555 3/2006
(Continued)

OTHER PUBLICATIONS

Extended European Search Report in European Application No. 19215904.4, dated Mar. 2, 2020, 8 pages.
(Continued)

*Primary Examiner* — Cristi J Tate-Sims
(74) *Attorney, Agent, or Firm* — Fish & Richardson P.C.

(57) ABSTRACT

A laundry machine includes a tub, a drum that is rotatably mounted in the tub, and an induction heater that is provided in the tub and configured to heat an outer circumferential surface of the drum. The laundry machine also includes a motor that is configured to rotate the drum, a user interface comprising a course selection unit that is configured to allow a user to select a course, and an option selection unit that is configured to allow the user to select option information that is related with the course selected. The laundry machine further includes a processor that is configured to control the drum rotation speed and the induction heater. The course selection unit comprises a wash-drying course that performs heat-spinning by default, the heat-spinning being configured to heat the drum by driving the induction heater when the drum rotates.

17 Claims, 12 Drawing Sheets

(51) Int. Cl.
*D06F 25/00* (2006.01)
*D06F 33/00* (2020.01)
*D06F 37/30* (2020.01)
*D06F 37/36* (2006.01)
*D06F 105/48* (2020.01)
*D06F 103/24* (2020.01)

(52) U.S. Cl.
CPC ............ *D06F 37/304* (2013.01); *D06F 37/36* (2013.01); *D06F 2103/24* (2020.02); *D06F 2105/48* (2020.02)

(56) References Cited

U.S. PATENT DOCUMENTS

| | | | |
|---|---|---|---|
| 2006/0137108 A1* | 6/2006 | Cho | ........................ D06F 25/00 8/158 |
| 2008/0216249 A1 | 9/2008 | Sa et al. | |
| 2011/0099732 A1 | 5/2011 | Im et al. | |
| 2011/0252577 A1* | 10/2011 | Kim | ...................... D06F 35/008 8/137 |
| 2012/0036650 A1* | 2/2012 | Hong | .................... D06F 35/007 8/137 |
| 2013/0091727 A1 | 4/2013 | Yoo et al. | |
| 2018/0057995 A1* | 3/2018 | Kim | ........................ D06F 39/04 |

FOREIGN PATENT DOCUMENTS

| | | |
|---|---|---|
| KR | 20150026549 | 3/2015 |
| KR | 20180099588 | 9/2018 |
| RU | 2435889 | 12/2011 |

OTHER PUBLICATIONS

PCT International Search Report and Written Opinion in International Application No. PCT/KR2019/017564, dated Apr. 23, 2020, 12 pages.
Search Report in Russian Appln. No. 2021117025, dated Dec. 17, 2021, 4 pages (with English translation).

* cited by examiner

LAUNDRY MACHINE HAVING INDUCTION HEATER AND CONTROL METHOD OF THE SAME

CROSS-REFERENCE TO RELATED APPLICATIONS

This application claims priority to Korean Patent Application No. 10-2018-0161336, filed on Dec. 13, 2018, the entire contents of which is hereby incorporated by reference in its entirety.

BACKGROUND OF THE DISCLOSURE

Field of the Disclosure

Embodiments of the present disclosure relate to a laundry machine, more particularly, a laundry machine which may heat a drum by means of an induction heater, and a control method of the same.

Background of the Disclosure

A laundry machine includes a tub (or an outer tub) that holds wash water; and a drum (or an inner tub) rotatably mounted in the tub. Laundry is loaded in the drum and washed by a washing detergent and wash water as the drum is rotated.

To improve a washing effect by promoting the activation of the washing detergent and the decomposition of contaminants, high-temperature washing water is supplied to the tub or washing water is heated in the tub. For that, a heater mounting portion is formed in a bottom of the tub in a recess shape and a heater may be mounted in the heater mounting portion. Such a heater is usually a sheath heater.

Washing is completed with the completion of spinning. The spinning means that the water contained in the laundry by using a centrifugal force of the drum rotating at a high rotation speed. After the completion of the spinning, a user may dry the laundry naturally or using a dryer. Accordingly, it is recommended to remove much as from the laundry during the spinning cycle as possible. In other words, the water content may be lowered as much as possible.

However, if increasing the duration of the spinning, the amount of the water separated from the laundry by the centrifugal force is restricted. So, it is conventional to determine a spinning RPM and a spinning time to be between energy consumption and spinning efficiency.

To enhance the spinning efficiency, heat-spinning may be performed. The heat-spinning means a technique invented to lower the water content of the laundry by raising the temperature of the wash water during the spinning and weakening the viscosity of the water contained in the laundry.

The point of heating for the heat-spinning may be when the spinning is performed after a preliminary heating or heating is performed during the spinning. As another example, the heating may be performed both before starting the spinning and while the spinning is performed.

Such the heat-spinning may be performed in a laundry apparatus having both washing and drying functions. In other words, the laundry apparatus having the washing and drying functions may include a heater configured to heat air for such the heat-spinning as well as a sheath heater configured to heat wash water. Here, such the laundry apparatus having the washing and drying functions may include a fan and a duct that are provided to supply heated-air to a drum.

The power consumed by the motor in the spinning may be variable based on RPM and laundry eccentricity. As RPM and laundry eccentricity are higher and larger, the power consumed by the motor becomes larger. The maximum power allowed to the laundry machine, in other words, the maximum momentary power is limited. Specifically, the maximum momentary power of the laundry machine is preset to be an allowable power value or less so as to protect the laundry machine. Accordingly, the output upper limit of the heater is preset in consideration of the maximum allowable power for each section of all the other loads during the spinning, except the heater, and the output upper limit of the heater in the spinning is preset. In other words, the heat-spinning is performed based on the heater output having a fixed value.

Accordingly, power stability of the laundry machine may be secured but there may be a problem of a failure in effectively using the heat-spinning. Especially, even in case of a low RPM and small eccentricity, only the limited output of the heater is used such that efficiency is likely to deteriorate.

A material has a property that a stress causing deformation is lowered as the temperature rises. As a spinning RPM rises, the stress applied to a system (e.g., a tub and a bearing) also rises. Accordingly, the system is likely to be deformed at a high RPM as the temperature rises. Considering system stability, the maximum value of the heating temperature in the heat-spinning may be set based on the maximum RPM. In other words, the uppermost limit of the heating temperature is preset and the heat-spinning is performed based on the uppermost limit. As one example, when the maximum target RPM of the spinning is 1200 RPM in the laundry apparatus, the uppermost limit of the heating temperature may be preset to be 60° C., Accordingly, since one fixed temperature uppermost limit, in other words, one temperature limit is used, heating will not be performed at the one temperature limit or more even though additional heating is possible, which will end up with a low efficiency. Especially, even though additional heating is possible at a low RPM, the heating is not performed at the temperature uppermost limit or more and the efficiency cannot but deteriorate.

Meanwhile, Japan Open-laid Patent Application No. JP2004-135998A (hereinafter, "Cited reference") discloses a dryer or a dryer having a washing function which may heats a drum by means of a microwave heating device, an electromagnetic induction device or an infrared ray heating device.

The cited reference discloses a basic characteristic of performing the drying by heating the drum. In addition, the cited reference discloses that wash water or rinse water is heated in the washing or rinsing so as to enhance a washing effect and reduce the drying time after the spinning.

Accordingly, the cited reference does not disclose a control method for performing the spinning by heating the drum in the spinning. Especially, the drum rotation and the drum heating that are related with the rotation RPM during the spinning are not disclosed in the cited reference. In addition, the cited reference does not disclose the drum heating during the spinning that is related with the instantaneous power.

Accordingly, it is needed to secure an optimal spinning performance by effectively heating the drum in the spinning.

In the conventional laundry machine having the washing and drying functions, the washing is a main function and the drying is an auxiliary function. Different from the dryer having only the drying function, the laundry machine having the washing and drying functions may allow the drying to be selected as option.

Because of that, the conventional laundry machine having the washing and drying functions is not provided with diverse drying functions and the user is not allowed to select diverse drying courses or functions disadvantageously.

In addition, it is disadvantageously difficult in the conventional laundry machine having the washing and drying functions to sequentially and automatically perform the washing and the drying based on one selected course.

In a specific region, a midnight electricity rate is relatively low such that the washing or the drying may be performed at midnight. However, the effective washing or drying cannot be performed because of a noise problem.

As one example, unless the sufficient spinning is performed during the washing based on a midnight mode, it might frequently occur that the spinning has to be performed again. As another example, unless the sufficient drying is performed during the drying based on the midnight mode, it might also frequently occur that the drying has to be performed again.

Accordingly, there are needs for a laundry machine that may allow the user to select diverse drying conditions and provide such diverse drying conditions. Especially, there are needs for a laundry machine that may perform effective spinning and drying when the washing or the drying is performed at midnight.

SUMMARY OF THE DISCLOSURE

Accordingly, an object of the present disclosure is to address the above-noted and other problems.

Another object of the present disclosure is to provide a laundry machine that may apply a convection heating method using an induction heater so as to solve the problem of the conventional heating, spinning and/or drying method using the heated-air, and a control method of the same.

A further object of the present disclosure is to provide a laundry machine that may allow the user to easily select heat-spinning configured to perform spinning by heating a drum and normal spinning configured to perform spinning without heating the drum, and a control method of the same.

A still further object of the present disclosure is to provide a laundry machine that may allow the user to select one course when wishing to perform the washing and the drying, and a control method of the same.

A still further object of the present disclosure is to provide a laundry machine that may allow the user to select diverse drying courses based on whether to perform heat-spinning and/or heat-spinning conditions, and a control method of the same.

A still further object of the present disclosure is to provide a laundry machine that may include a drying course provided in a course selection unit to perform heat-spinning by default and a spinning option provided in an option unit to select whether to perform the heat-spinning such that the user can select diverse spinning and drying conditions easily, and a control method of the same.

A still further object of the present disclosure is to provide a laundry machine that may secure a good spinning performance by effectively reducing water content even at a low RPM of a drum, and a control method of the same.

A still further object of the present disclosure is to provide a laundry machine that may effectively secure a spinning performance even in a washing environment requiring low noise and low vibration, and a control method of the same.

A still further object of the present disclosure is to provide a laundry machine that may meet spinning performance and/or a drying function by allowing a user to select a night mode or a silent mode in an environment requiring low noise or low vibration and controlling heat-spinning to be automatically performed in such modes, and a control method of the same. Especially, the laundry machine may meet the spinning performance and/or the drying function by automatically raising a heating amount even when the spinning is performed at a relatively low RPM.

A still further object of the present disclosure is to provide a laundry machine that may secure stability by varying heater output based on a spinning RPM and enhance user satisfaction for the spinning and the drying, and a control method of the same. Especially, the object is to provide a laundry machine that may effectively perform the spinning and the drying at midnight when a silent operation and a low-vibration are required, and a control method of the same.

A still further object of the present disclosure is to provide a laundry machine that may enhance heater output as high as closer to the maximum allowable power value, and a control method of the same. Especially, the object is to provide a laundry machine that may effectively perform the spinning and the drying at midnight when a silent operation and a low-vibration are required, and a control method of the same.

A still further object of the present disclosure is to provide a laundry machine that may perform a drying function without a fan configured to circulate air, a duct and an additional heater configured to heat air, and a control method of the same.

Embodiments of the present disclosure may provide a laundry machine comprising a tub; a drum that is rotatably mounted in the tub and holds laundry; an induction heater that is provided in the tub and configured to heat an outer circumferential surface of the drum located in opposite; a motor that is configured to drive so as to rotate the drum; a user interface comprising a course selection unit that is configured to allow a user to select one of courses; and an option selection unit that is configured to allow the user to select option information that is related with the course selected from the course selection unit; and a processor that is configured to control the drum RPM and the drive of the induction heater, wherein the course selection unit may include a wash-drying course that performs heat-spinning by default, the heat-spinning configured to heat the drum by driving the induction heater, when the drum rotates in the spinning.

The wash-drying course may be a course configured to automatically and sequentially perform drying after performing washing, rinsing and spinning.

The user is able to select the heat-spinning via the course selection unit intuitively such that convenient use may be facilitated.

A target RPM of the drum in the drying may be lower than a target RPM of the drum in the spinning. The time taken by the spinning may be set to be longer than the time taken by the drying. Especially, the drying time may be set to be the maximum allowable time. When a drying condition is satisfied before the maximum allowable time, the drying may end.

The wash-drying course may include a plurality of courses having respective target RPMs of the drum that are preset to be different from each other.

The heat-spinning time of one course having a low target drum RPM in the spinning (e.g., a first wash-drying course)

may be set to be longer than the heat-spinning time of another course having a high target drum RPM in the spinning (e.g., a second wash-drying course).

The processor may control the output of the induction heater to be variable during the heat-spinning of the first wash-drying course.

The laundry machine may further comprise an instantaneous power output unit configured to calculate and output an instantaneous output, wherein the processor controls the output of the induction hater to be variable based on the output of the instantaneous power output unit. Accordingly, the drum may be heated with the maximum allowable output so as to reduce the heating time.

The processor may control a heating target temperature that rises by the drive of the induction heater in the first wash-drying course to be set higher than a heating target temperature in the second wash-drying course.

The option selection unit may comprise an option that allows a user to select whether to perform the heat-spinning.

The option selection unit may include an option that allows a user to select a target RPM and a target temperature of the drum in the heat-spinning.

As the target RPM of the drum that is selected by the user becomes higher, a corresponding target temperature may be set to become lower.

The wash-drying course may comprise a course that is configured to automatically and sequentially perform drying after washing, rinsing and spinning; and a course that is configured to perform washing, rinsing and spinning and perform heat-spinning in the spinning. Accordingly, the heat-spinning default course may be selected and the drying default course may be selected such that the user may be provided with diverse heat-spinning and drying conditions through the course selection unit.

The course including the drying may include a plurality of courses having respective target RPMs of the drum in the spinning to be set different from each other.

The target drum RPM and the target drum temperature in the spinning of the course having the drying may be higher than the target drum RPM and the target drum temperature in the spinning of the course that ends after the heat-spinning.

The heat-spinning time of the course having the low target drum RPM in the spinning (the first wash-drying course) may be set to be longer than the heat-spinning time of the course having the high target drum RPM in the spinning (the second wash-drying course), among the courses having the drying.

The target drum RPM in the spinning of the course that ends after the heat-spinning (the third wash-drying course) may be equal to the target drum RPM in the second wash-drying course.

The spinning time of the third wash-drying course may be equal to the spinning time of the second wash-drying course.

The option selection unit may include an option that allows the user to select a target drum RPM and a target temperature in the heat-spinning.

Embodiments of the present disclosure may also provide a laundry machine including a tub; a drum that is rotatably mounted in the tub and holds laundry; an induction heater that is provided in the tub and configured to heat an outer circumferential surface of the drum located in opposite; a motor that is configured to drive so as to rotate the drum; a user interface comprising a course selection unit that is configured to allow a user to select one of courses; and an option selection unit that is configured to allow the user to select option information that is related with the course selected from the course selection unit; and a processor that is configured to control the drum RPM and the drive of the induction heater.

The course selection unit may include a wash-drying course that performs heat-spinning by default, the heat-spinning configured to heat the drum by driving the induction heater, when the drum rotates in the spinning; and a normal washing course that perform spinning, with excluding the drive of the induction heater in the spinning.

Accordingly, the user may select whether to perform the heat-spinning through the course selection unit. The user may also select whether to perform the drying. Thus, the laundry machine according to the present disclosure is very easy and intuitive to use. Also, an option that is related with the heat-spinning or the drying may be additionally provided such that diverse spinning and drying conditions may be provided.

The wash-drying course may include a plurality of courses that are categorized based on a target drum RPM in the heat-spinning.

Accordingly, optimal spinning and drying effects may be provided, regardless of RPMs in the spinning that is most related with the noise and vibration.

The present disclosure has the effect of providing a laundry machine that may apply a convection heating method using an induction heater so as to solve the problem of the conventional heating, spinning and/or drying method using the heated-air, and a control method of the same.

In addition, the present disclosure has the effect of providing a laundry machine that may allow the user to easily select heat-spinning configured to perform spinning by heating a drum and normal spinning configured to perform spinning without heating the drum, and a control method of the same.

In addition, the present disclosure has the effect of providing laundry machine that may allow the user to select one course when wishing to perform the washing and the drying, and a control method of the same.

In addition, the present disclosure has the effect of providing a laundry machine that may allow the user to select diverse drying courses based on whether to perform heat-spinning and/or heat-spinning conditions, and a control method of the same.

In addition, the present disclosure has the effect of providing a laundry machine that may include a drying course provided in a course selection unit to perform heat-spinning by default and a spinning option provided in an option unit to select whether to perform the heat-spinning such that the user can select diverse spinning and drying conditions easily, and a control method of the same.

In addition, the present disclosure has the effect of providing a laundry machine that may secure a good spinning performance by effectively reducing water content even at a low RPM of a drum, and a control method of the same.

In addition, the present disclosure has the effect of providing a laundry machine that may effectively secure a spinning performance even in a washing environment requiring low noise and low vibration, and a control method of the same.

In addition, the present disclosure has the effect of providing a laundry machine that may meet spinning performance and/or a drying function by allowing a user to select a night mode or a silent mode in an environment requiring low noise or low vibration and controlling heat-spinning to be automatically performed in such modes, and a control method of the same. Especially, the laundry machine may meet the spinning performance and/or the drying function by automatically raising a heating amount even when the spinning is performed at a relatively low RPM.

In addition, the present disclosure has the effect of providing a laundry machine that may secure stability by varying heater output based on a spinning RPM and enhance user satisfaction for the spinning and the drying, and a control method of the same. Especially, the object is to provide a laundry machine that may effectively perform the spinning and the drying at midnight when a silent operation and a low-vibration are required, and a control method of the same.

In addition, the present disclosure has the effect of providing a laundry machine that may enhance heater output as high as closer to the maximum allowable power value, and a control method of the same. Especially, the object is to provide a laundry machine that may effectively perform the spinning and the drying at midnight when a silent operation and a low-vibration are required, and a control method of the same.

In addition, the present disclosure has the effect of providing a laundry machine that may perform a drying function without a fan configured to circulate air, a duct and an additional heater configured to heat air, and a control method of the same.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Figure 1:
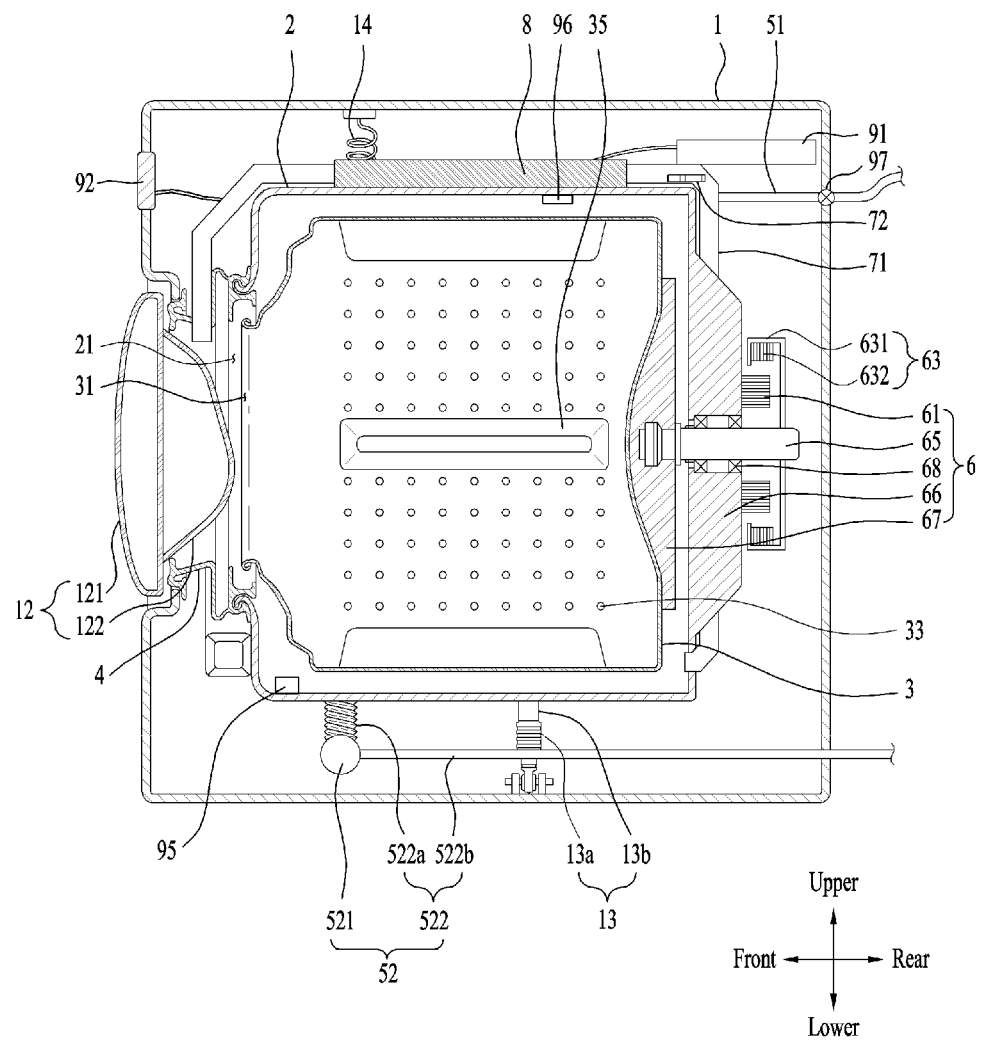
FIG. 1 is a sectional diagram illustrating a laundry machine according to one embodiment of the present disclosure.

Hereinafter, referring to FIG. 1, a laundry machine according to one embodiment of the present disclosure will be described.

Regardless of numeral references, the same or equivalent components may be provided with the same reference numbers and description thereof will not be repeated.

For the sake of brief description with reference to the drawings, the sizes and profiles of the elements illustrated in the accompanying drawings may be exaggerated or reduced and it should be understood that the embodiments presented herein are not limited by the accompanying drawings.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

The laundry machine according to one embodiment may include a cabinet 1 that defines an exterior design; a tub 2 provided in the cabinet; and a drum 3 that is rotatably mounted in the tub 2 and holds laundry (e.g., washing objects, drying objects and refreshing objects). As one example, when washing clothes by means of wash water, the laundry may be washing objects. When drying the washed-clothes by means of heated-air, the laundry may be drying objects. When refreshing dried-clothes by means of heated-air, cool air or steam, the laundry may be refreshing objects. Accordingly, a washing, drying or refreshing process for clothes may be performed in the drum 3 provided in the laundry machine.

The cabinet 1 may have a cabinet opening provided in a front side of the cabinet 1 to introduce the laundry and a door 12 rotatably coupled to the cabinet to open and close the cabinet opening.

The door 12 may include a circular door frame 121 and a transparent window 122 provided in a center area of the door frame.

In this instance, as defining directions to help a specific structure of the washing machine which will be described later to be understood easily, a direction towards the door 12 with respect to the center of the cabinet 1 may be defined as a front direction.

Also, the reverse of the direction towards the door 12 may be defined as a rear direction. Right and left directions may be naturally defined with respect to the front and rear directions defined above.

The tub 12 may be formed in a cylindrical shape with a longitudinal axis that is oriented in parallel with a bottom of the cabinet or keeps a tilted state by an angle of 0~30 degrees with respect to the bottom, and define a predetermined space for storing water. The tub 12 may include a tub opening 21 that is in communication with the cabinet opening.

The tub 2 may be fixed to a lower surface (or the bottom) of the cabinet 1 by a lower support 13 including a support bar 13a and a damper 13b connected with the support bar 13a. Accordingly, the vibration generated in the tub 2 by the rotating drum 3 may be suspended or damped.

In addition, an flexible supporting portion 14 fixed to an upper surface of the cabinet 1 may be connected with an upper surface of the tub 2 so as to dampen the vibration transferred to the cabinet 1 from the tub 2.

The drum 3 may be formed in a cylindrical shape with a longitudinal axis that is in parallel with or tilted an angle of 0~30 degrees with respect to the lower surface (or the bottom) of the cabinet 1. The drum 3 may include a drum opening 31 formed in a front side and communicable with the tub opening 21. The angle formed by the central axis of the tub 2 and the central axis of the drum 3 with respect to the bottom may be equal.

The drum 3 may include a plurality of through-holes 33 penetrating an outer circumferential surface of the drum 3 such that air and wash water may flow between the inside of the drum 3 and the inside of the tub 2 via the through-holes 33.

A lifter 35 may be further provided in an inner circumferential surface of the drum 3 to agitate the laundry during the rotation of the drum. The drum 3 may be rotatable by a drive unit 6 provided in a rear side of the tub 2.

The drive unit 6 may include a stator 61 fixed to the rear surface of the tub 2; a rotor 63 that is rotatable based on an electromagnetic interaction with the stator; and a shaft 65 provided to connect the drum 3 and rotor 63 with each other via the rear surface of the tub 2.

The stator 61 may be fixed to a rear surface of a bearing housing 66 that is provided in the rear surface of the tub 2. The rotor 63 may be configured of a rotor magnet 632 that is provided in an outer area with respect to a radial direction of the stator and a rotor housing 631 provided to connect the rotor magnet 632 and the shaft 65 with each other.

The bearing housing 66 may include a plurality of bearings 68 that are supports the shaft 65.

A spider 67 may be provided in the rear surface of the drum 3 to transfer the rotational force of the rotor 63 to the drum 3 smoothly and the shaft 65 may be fixed to the spider 67 to transfer the rotational power of the rotor 63.

Meanwhile, the laundry machine according to the embodiment may further include a water supply hose 51 that is configured to receive water from an outer water supply source. The water supply hose 51 may form a channel configured to supply water to the tub 2.

In addition, a gasket 4 may be provided between the cabinet opening and the tub opening 21. The gasket 4 may be configured to prevent water leakage from the tub to the cabinetl and the vibration of the tub 2 from being transferred to the cabinet 1.

Meanwhile, the laundry machine according to the embodiment may further include a water discharge unit 52 configured to discharge the water held in the tub 2 outside the cabinet 1.

The water discharge unit 52 may include a water discharge pipe 522 that forms a water discharge channel of the water held in the tub 2 and a water discharge pump 521 configured to generate a pressure different inside the water discharge pipe 522.

More specifically, the water discharge pipe 522 may include a first water discharge pipe 522a provided to connect the lower surface of the tub 2 and the water discharge pump 521 with each other; and a second water discharge pipe 522a having one end connected with the water discharge pump 521 to form a channel of water flowing outside the cabinet 1.

In addition, the laundry machine may further include a heating unit 8 that is configured to induction-heat the drum 3.

The heating unit 8 may be mounted to a circumferential surface of the tub 2 and configured to induction-heat a circumferential surface of the drum 3 by means of a magnetic field that is generated once an electric current is applied to a coil having wires wounded there around. Accordingly, it can be said that the heating unit is an induction heater. Once such an induction heater is driven, the circumferential surface of the drum that is located in opposite to the induction heater 9 may be heated to a very high temperature soon.

The heating unit 8 may be controlled by a controller 9 fixedly provided in the cabinet 1 and the controller 9 may be configured to control the driving of the heating unit 8 to control the temperature inside the tub. The controller 9 may include a processor configured to control the drive of the laundry machine and an inverter processor configured to control the heating unit. In other words, the drive of the laundry machine and the drive of the heating unit 8 may be controlled by using one processor.

However, to prevent the overload of the processor and enhance control efficiency, a processor for controlling the drive of the laundry machine and another processor for controlling the drive of the heating unit are provided independently, while they are communication-connected with each other.

A temperature sensor 95 may be provided in the tub 2. The temperature sensor 95 may be connected to the controller 9 to transmit information about temperatures inside the tub 2 to the controller 9.

The temperature sensor 95 may be provided near the bottom of the tub inside. Accordingly, the temperature sensor 95 may be located lower than the lowermost area of the drum. In FIG. 1, the temperature sensor 95 is provided in contact with the bottom of the tub. However, it may be spaced a preset distance apart from the bottom. That is to allow wash water or air to surround the temperature sensor so as to measure the temperature of the wash water or air. Although mounted through the tub from the bottom to the top, the temperature sensor 95 may be mounted through the tub from the front side to the rear side. In other words, it may penetrate the front side (or the surface that forms the tub opening), not the circumferential surface of the tub.

Accordingly, when the laundry machine is operated to heat wash water by means of the induction heater 8, the temperature sensor may sense whether the wash water is heated to a target temperature or not. The drive of the induction heater may be controlled based on the result of the temperature sensing.

In addition, when all of the wash water is discharged, the temperature sensor 95 may sense the temperature of air. Specifically, the temperature of the air heated by the induction heater 8, in other words, a drying temperature may be sensed.

Meanwhile, the laundry machine according to one embodiment may include a drying temperature sensor 96. The drying temperature sensor 96 may have a different installation position and a different temperature measuring object from the above-noted temperature sensor 95. Accordingly, it may be sensed whether the air is heated until a target temperature based on the temperature sensed by the drying temperature sensor. The drive of the induction heater may be controlled based on the result of the temperature sensing performed by the drying temperature sensor.

The drying temperature sensor 96 may be located in an upper area of the tub 2 and near the induction heater 8. In other words, the drying temperature sensor 96 may be provided in an inner surface of the tub 2 to sense the temperature of the outer circumferential surface of the drum 3 that is located in opposite. While the temperature sensor 95 mentioned above is configured to sense water or air nearby, the drying temperature sensor 96 may be configured to sense the temperature of the drum.

Since the drum 3 is a rotatable element, the temperature of air near the outer circumferential surface of the drum 3 may be sensed to sense the temperature of the outer circumferential surface indirectly.

The temperature sensor 95 may be provided to determine whether to maintain the drive of the induction heater until the target temperature or to change the output of the induction heater. The drying temperature sensor 96 may be provided to determine whether the drum is overheated or whether the drum is continuously heated during the spinning or drying. When it is determined that the drum is overheated or that the air is heated until the target temperature, the drive of the induction heater may be forcedly.

The laundry machine according to one embodiment may have a drying function. In this instance, the laundry machine according to the embodiment may be a laundry machine having washing and drying functions or a washing machine having a drying function. For that, the laundry machine may further include a fan 72 configured to blow air into the tub 2; and a duct 71 in which the fan 72 is installed. Here, even unless such components are additionally provided, the drying function may be performed. In other words, air may be chilled in the inner circumferential surface of the tub and moisture may be condensed to be discharged. That is, the moisture condensation may be performed even without the air circulation so as to perform the drying function. To enhance drying efficiency by more effective moisture condensation, a coolant may be supplied to the tub. It is better when a surface area where the coolant meets the tub, in other words, where the coolant contacts with air is broader. For that, the coolant may be supplied while spreading broadly from the rear surface or some area of the tub or both lateral surfaces of the tub. Such supply of coolant may flow along an inner surface of the tub, not to be drawn into the drum. Accordingly, the duct or fan for the drying may be omitted such that the laundry machine may be manufactured and assembled easily.

In this instance, it is not necessary to provide an additional heater for the drying. In other words, the induction heater 8 may be used in performing the drying. Specifically, one induction heater may be used in heating wash water during the washing, heating the laundry during the spinning and heating the drying objects during the drying.

Once the induction heater 8 is driven together with the drum 3, the entire area of the outer circumferential surface of the drum may be substantially heated. The heated drum may exchange heat with the wet laundry and the laundry may be heated. Of course, air inside the drum may be heated. Accordingly, when supplied to the drum 3, air may be heat-exchanged and the air having moisture evaporated there from may be discharged outside the drum 3. In other words, air may be circulated between the duct 71 and the drum 3. Here, the fan 72 may be driven for the air circulation.

An air supply position and an air discharge position may be determined to uniformly supply air to the drying objects or washed clothes and smoothly discharge humid air. For that, air may be supplied from a front upper area of the drum 3 and discharged from a rear lower area of the drum, in other words, a rear lower area of the tub.

The air discharged via the rear lower area of the tub may flow along the duct 71. Moisture may be condensed from the humid air by the condensate supplied to the duct 71 through a condensate channel 51 formed in the duct 71. When moisture is condensed from the humid air, the humid air may be changed into low-temperature dry air and such low-temperature dry air may be flowing along the duct 71 and re-supplied to the drum 3.

Since air is not heated directly, the temperature of the heated-air may be lower than the heated-air in the conventional heater heating dryer. Accordingly, an effect of preventing damage or deformation of clothes that might be caused by the high temperature may be expected. Also, the clothes may be overheated in the drum heated at the high temperature.

However, the induction heater is driven together with the drum as mentioned above and the clothes repeatedly rise and falls as the drum is driven. Also, a heating position of the drum is located in the upper area of the drum, not the lower area. Accordingly, the overheating of the clothes may be effectively prevented.

A control panel 92 may be provided in a front or top surface of the laundry machine. The control panel may be provided for user interface. A user's diverse orders are input to and diverse pieces of information may be displayed on the control panel. In other words, the control panel 92 may include a manipulation unit configured to facilitate the user's manipulation and a display unit configured to display information.

Figure 2:
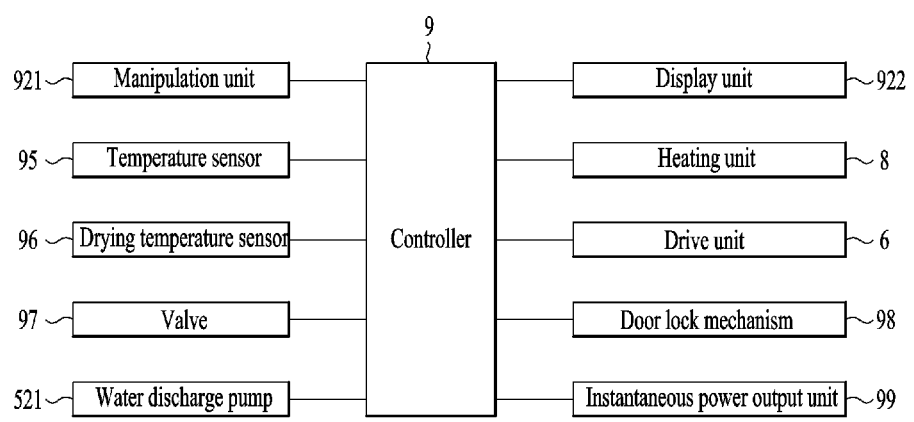
FIG. 2 is a block diagram illustrating a control configuration of a laundry according to one embodiment of the present disclosure.

FIG. 2 is a block diagram of a system that is provided in the laundry machine according to one embodiment.

The controller 9 may be implemented to control the drive of the heating unit, in other words, the induction heater 8 based on the sensing of the temperature sensor 95 and the drying temperature sensor 96. The controller 9 may also control the drive of the drive unit configured to rotate the drum by means of the motor and the drive of the diverse sensors and hardware. The controller 9 may control diverse valves or pumps for the water supply, the water discharge and the coolant supply and the control of the fan.

Especially, the laundry machine according to the embodiment may further include a coolant valve 97 configured to change a high-temperature humid air environment into a low-temperature dry air environment. The coolant valve 97 may supply cold water to the tub or the duct to chill air and condensate moisture from the air.

The water discharge pump 421 may be periodically or intermittently driven during the spinning and/or the coolant supply.

The laundry machine according to the embodiment may include a door lock mechanism 98. The door lock mechanism may be provided to prevent the door from opening during the operation of the laundry machine. According to the illustrated embodiment, the door opening may be limited when the inner temperature is a preset temperature or more during the operation of the laundry machine or even after the operation.

In addition, the controller 9 may control diverse display units 922 that are provided in the control panel 92. The controller 9 may be provided with a signal input from diverse manipulation units 921 that are provided in the control panel 92 and control the overall drive of the laundry machine based on the signal.

Meanwhile, the controller 9 may include a main processor configured to control the conventional drive of the laundry machine and an auxiliary processor configured to control the drive of the induction heater. The main processor and the auxiliary processor may be independently provided and communication-connected with each other.

According to one embodiment of the present disclosure, the output of the induction heater may be variable. The output of the induction heater may be enhanced in the maximum allowable condition or range so as to reduce the heating time and the maximum effect may be then gained. For that, the laundry machine according to one embodiment may include an instantaneous power output unit 99, which will be described in detail later.

Hereinafter, referring to FIG. 3, the output variation of the induction heater that may be applicable to the embodiment of the present disclosure will be described in detail.

The maximum allowable power may be preset in the laundry machine. Specifically, the laundry machine may be manufactured to be actuated with a preset value that is less than the maximum allowable power, which is referenced to as a system allowable power in FIG. 3.

The hardware that consumes the power the most in the laundry machine may be the induction heater 8, the motor configured to rotate the drum, in other words, the drive unit 6.

Figure 3:
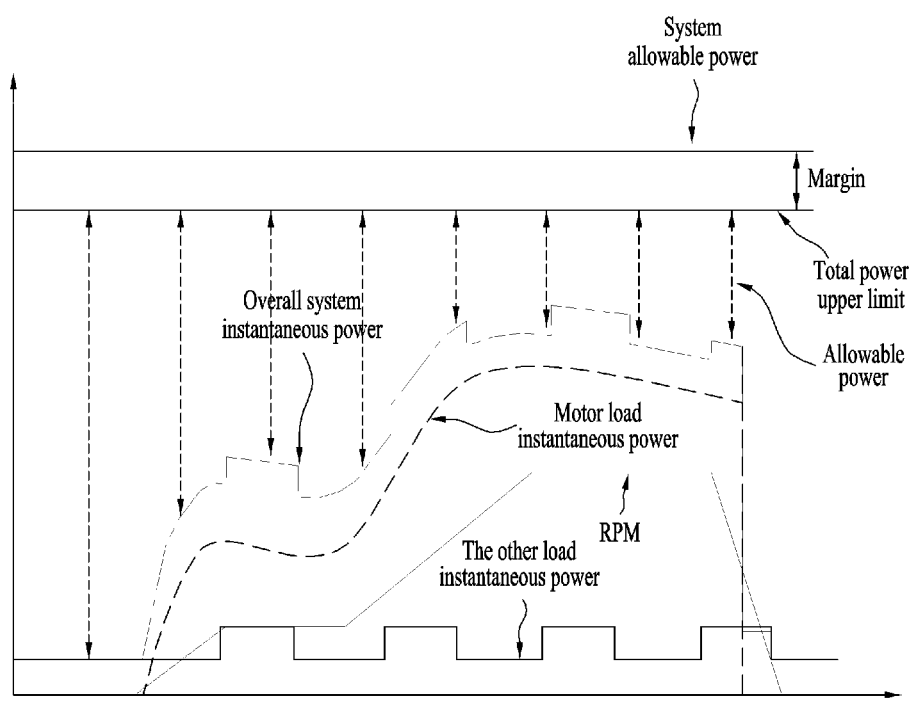
FIG. 3 is a graph to describe output variation of an induction heater provided in the laundry machine.

As illustrated in FIG. 3, the power used in the drive unit, in other words, the instantaneous power consumed in the drive unit tends to increase more as RPM rises higher. Also, the instantaneous power also tends to increase more as the laundry eccentricity becomes larger. When the power used in the drive unit increases, it is shown that the instantaneous power consumed in the overall system may also increases. Specifically, it can be figured out that most of the instantaneous power consumed in the overall system is the power consumed in the drive unit.

In the heat-spinning, the control panel 92, the various valves 97, the water discharge pump 521 and the diverse sensors 95 and 96 as well as the induction heater 8 and the drive unit 6 may also consume the power. Accordingly, once the allowable power value is determined in the laundry machine, the total power upper limit that can be used in the laundry machine may be preset in consideration of margin.

The output of the sheath heater in the heat-spinning may be preset in the conventional laundry machine. Specifically, the output of the sheath heater may be preset to be smaller than a value gained after subtracting the maximum power value, except the maximum power allowed to the sheath heater during the heat-spinning, from the total power upper limit.

Easy description about that will be as follows. When the allowable power of the laundry machine system is 100 and margin is 10, the total power upper limit may be 90. When the maximum power value except the sheath heater during the spinning is 70, the output of the sheath heater should be set to be less than 20. Here, the maximum power value except the sheath heater may be a value that is gained after all the power consumed by the hardware except the sheath heater in the maximum RPM and laundry eccentricity environment (the severe eccentricity environment) are added.

The output variation of the sheath heater is quite limited. When using such the sheath heater, the heater might not be used in the normal environment as much as possible, not the severe environment.

To solve the problem, the laundry machine according to the embodiment may further include an instantaneous power output unit 99, specifically, an output unit configured to calculate the instantaneous power or calculate and output the instantaneous power. Such the instantaneous power output unit 99 may be independently provided from the controller 9 or partially independent from the controller. Alternatively, it may be dependently provided in the controller.

As mentioned above, the hardware element that uses the largest power except the induction heater 8 in the heat-spinning may be the motor, in other words, the drive unit 6. The maximum power of the other hardware elements in the heat-spinning, except the induction heater and the drive unit, may be preset. The maximum power of the other hardware elements may be relatively small.

Accordingly, the instantaneous power output unit 99 may be configured to estimate or calculate the instantaneous power of the motor for driving the drum.

As one example, an input current of the motor and a DC link voltage may be sensed and the instantaneous power of the motor may be calculated based on the sensed current and voltage.

As another example, the instantaneous power of the motor may be calculated based on the input current and voltage that are input to the motor.

As another example, the instantaneous power of the motor may be calculated based on the input current that is input to the motor and an AC input voltage that is applied to the laundry machine.

Accordingly, the instantaneous power output unit 99 may include a device, an element or a circuit that is configured to sense the current and voltage. It may be a unit configured to output the calculated instantaneous power of the motor Once the instantaneous of the motor is calculated, the allowable output of the induction heater 8 may be calculated. Specifically, the allowable induction heater output may be the value gained after the calculated instantaneous power of the motor and the calculated value of the other hardware elements are subtracted from the total power upper limit.

Here, the instantaneous power of the motor may be changed in a wide variation, because a RPM variation and a laundry eccentricity variation are sharp. Accordingly, the power of the motor may be the calculated value of the instantaneous power or current power. In contrast, the maximum output of the other hardware elements may be changed in a gentle or narrow variation and such that the maximum output may be preset as the upper limit and used as the fixed value. Here, the maximum output of the other hardware elements may be also calculated based on the instantaneous power. However, the output value of the other hardware elements is relatively small such that it is not excluded that an additional device or circuit for measuring or calculating the power based on the output value as the fixed value.

Meanwhile, the instantaneous power output unit 99 may be configured to estimate or calculate the entire instantaneous power of the laundry machine. As one example, the entire instantaneous power of the laundry machine may be calculated based on the AC input current and voltage that are applied to the laundry machine. The entire instantaneous power in the heat-spinning may be the total sum of the outputs of the induction heater, the motor and the other hardware elements. Accordingly, a difference between the entire instantaneous power and the total power upper limit may mean the additional power that may enhance the output of the induction heater. As one example, when the current entire instantaneous power is 50 and the total power upper limit is 90, it means that the maximum power of the induction heater may increase by 40.

According to this embodiment, it means that the output of the induction heater is secured as much as possible, in a state of the allowable power in the current system. Specifically, when the motor consumes much power, the output of the heater may be reduced. When the motor consumes a little currents, the output of the heater may be increased.

Figure 4:
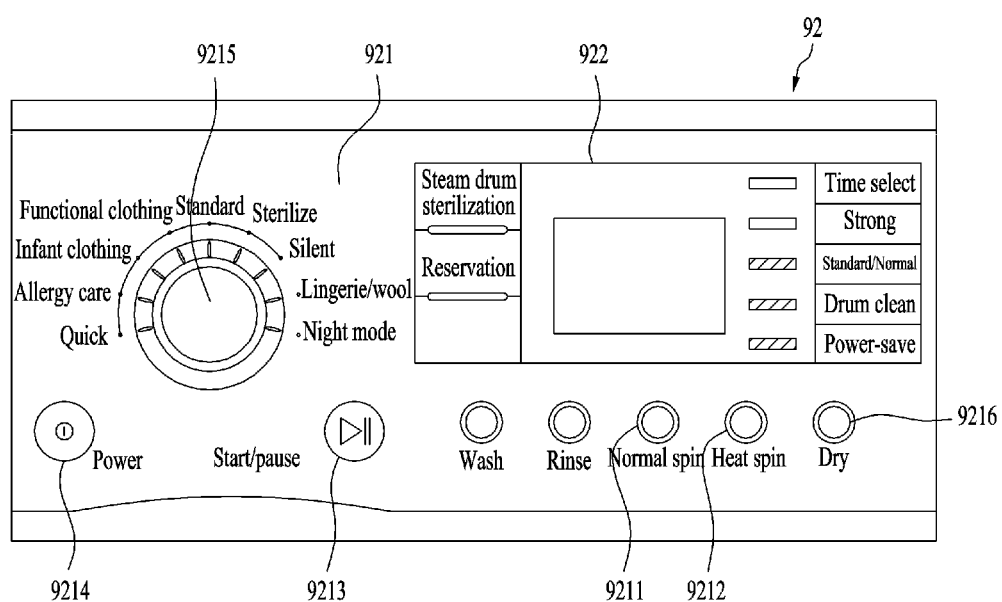
FIG. 4 is a diagram illustrating one example of a control panel provided in a laundry machine according to one embodiment.

FIG. 4 illustrates one example of a front side provided in the control panel 92 including the manipulation unit 921 and the display unit 922.

The manipulation unit 921 may include a course selection unit 9215 to allow the user to select one of the washing courses. The plurality of the washing courses may be diverse based on types of laundry and purposes. The user may select a specific one of the washing courses and the processor may be implemented to perform the selected specific washing course based on preset control logic.

The washing courses may include a washing cycle, a rinsing cycle and a spinning cycle. Such cycles may be sequentially performed and the washing course may be completed. In each one of the washing courses, one or more of a cycle duration, a moving rate of the drum and a spinning RPM may be set to be different.

As one example, the spinning RPM may be preset to be approximately 1000 RPM or 1200 RPM in a normal course or allergy care course. In a silent course, a lingerie/wool course (or a delicate course) and a night mode, the spinning RPM may be set to be approximately 400 RPM to 800 RPM. In a specific course, the spinning RPM may be set to be changeable if necessary. In another specific course, the spinning RPM may be set to be unchangeable.

To change the spinning RPM, a normal spinning option unit 9211 may be provided. In the normal spinning option unit 9211, the user may change the spinning RPM set by the course selection. As one example, when the spinning RPM is set to be 1000 RPM in the normal course by default, the user may change the spinning RPM into 800 RPM through the normal spinning option unit 9211. In this instance, the spinning may be performed to 800 RPM as a target RPM, while the normal course is performed.

Here, the spinning RPM means the target RPM in the spinning cycle. While the drum is rotating at a low RPM, the laundry distribution and rotation is avoided. The rotation of the drum may be maintained for a preset time period at the target RPM after reaching the target RPM finally.

When the washing is performed in a very silent state (e.g., the night mode), the spinning RPM preset by default (e.g., 600 RPM) may be limited to be changed through the normal spinning option unit 9211.

The normal spinning option unit 9211 may allow the user to select one of the spinning RPM steps.

According to this embodiment, a heat-spinning option unit 9212 may be provided. The heat-spinning option unit 9212 may be a selecting unit configured to select whether to heat the clothes by driving the induction heater during the spinning cycle.

When the temperature of the clothes rises, the moisture discharged from the clothes by means of the centrifugal force may be promoted more. Accordingly, the drum rotation together with the heating may promote the spinning efficiency more than only the drum rotation.

The user may select one specific course via the course selection unit 9212 and also select the heat-spinning option unit 9212 to enhance the spinning efficiency. Here, the user may select the heat-spinning option unit 9212 just to perform heating during the spinning of the elected specific course. However, the processor may control the output of the induction heater based on the instantaneous power, while performing the heat-spinning.

In other words, as the current spinning RPM is higher, the instantaneous power increases more enough to reduce the output of the induction motor. In contrast, as the current spinning RPM is lower, the instantaneous power decreases more enough to increase the output of the heater.

When needing to perform washing late at night or in quite a silent state, the user may select the silent course or the night mode course through the course selection unit 9215. In such the courses, the moving rate of the drum (or the rate of the time when the drum is substantially rotating in a drum operation section) may be lowered to minimize noise during the washing. Here, the duration of the washing may be increased in comparison with the other courses so as to secure the washing performance.

While the washing performance may be secured in such the night mote course or the silent course, it is difficult to secure spinning performance. Since noise and vibration are likely to occur during the spinning at a high rotation number, the spinning target RPM is set to be low in such the courses. When it is approximately 1200 RPM or more in the normal courses, the spinning target RPM may be approximately 800 RPM in such the courses.

Accordingly, much moisture remains in the clothes after the spinning such that the user may determine that sufficient spinning is not performed.

However, according to this embodiment, the output of the induction heater may be even raised when the spinning is performed at a low target RPM such that the spinning performance may be enhanced by the raised temperature. In other words, the moisture discharge promoted by the moisture evaporation may be performed as well as the moisture discharge promoted by the centrifugal force.

During the spinning, the wash water may be basically discharged from the tub. Specifically, there is little wash water that remains in the tub, because the wash water is discharged. Accordingly, when the induction heater is operated to heat the drum and the clothes, the temperature inside the tub may rise. At this time, the temperature sensor 95 may sense the temperature inside the tub. In other words, the processor is implemented to stop the driving of the induction heater to end the heating, once determining that the temperature sensor 95 senses the heating target temperature. When the driving of the induction heater is stopped, the temperature may be lowered in the tub. Accordingly, the temperature inside the tub falls to a preset temperature or less, for example, 5° C. from the heating target temperature, the drive of the induction heater may re-start. Once the heating temperature reaches the heating target temperature again, the drive of the induction heater may be stopped.

Basically, the processor 9 may drive the induction heater 8 while the drum is being driven. The drive of the drum and the drive of the induction heater may be synchronized. However, in this instance, fabric damage from heat is likely to occur at a point of drum rotation starting or ending. That is because the induction heater may heat the drum to a very high temperature in a moment and the drum rotation RPM is very low at the point of the drum rotation starting and ending such that the contact time between the drum and the clothes may be increased.

The tumbling mode of the drum may be performed between 40~60 RPM. At this time, the clothes may repeatedly rise and fall. Accordingly, the start point of the induction heater driving may be later than the start point of the drum rotating. As one example, when it takes approximately 1 second for the drum RPM to reach a tumbling RPM after the drum rotating starts and accelerate, a start point of the induction heater driving may be approximately 0.5 second after the drum rotating starts. Here, the induction heater driving may start once the drum RPM reaches the tumbling RPM.

However, the time taken to reach the heating target may become shorter than the heating time. Accordingly, to prevent the fabric damage from heat and secure the sufficient heating time simultaneously, the processor may control the induction heater to be driven before the drum RPM reaches the tumbling RPM once the drum rotating starts (or the motor is switched on). For that, the driving point of the induction heater may be set for the drum rotation to be performed for a preset time period or for the drum RPM to reach a preset RPM.

An algorithm configured to disperse the laundry and avoid resonance by repetition of the drum rotation and pausing may be applied to the spinning. In other words, the drum RPM may be accelerated from the starting of the spinning and reach the spinning target RPM and then the spinning may not be performed.

Accordingly, the spinning cycle may be classified into an initial spinning and a late spinning. The late spinning is a section in which the drum is rotating at the spinning target RPM to perform the spinning seriously. Once the late spinning completes, the spinning may end. The initial spinning may be section in which the late real spinning is prepared. In the initial spinning, the drum may be drive at a middle RPM that is lower than the final spinning target RPM to determine whether the laundry distribution and resonance occur because the drum is rotated at the lower RPM. The times taken to perform such processes may be changeable based on the laundry distribution and the laundry amount.

The heat-spinning may be performed when heating is excluded in the late spinning after the induction heater is driven to the heating target temperature in the initial spinning. At this time, even unless the drum RPM reaches the heating target temperature after the initial spinning, the late spinning may be performed. That is because the initial spinning stage may enter into the late spinning stage in a moment.

The heat-spinning may be performed when the induction heater is driven to the heating target temperature in the late spinning. At this time, the heat-spinning may end right after the late spinning. After that, the spinning time may be reduced in the heating environment and the user may not take out the clothes immediately, because the heated temperature has to be lowered.

The heat-spinning may be performed during the initial spinning and the late spinning. In this instance, the duration of the heating environment may be increased more is more likely to reach the heating target temperature. Also, it is more likely to reach the heating target temperature in an early state of the late spinning, not right before the end of the late spinning. Accordingly, it is more likely to take out the clothes right after the spinning.

The laundry machine according to this embodiment may be a washer having no drying function. Nevertheless, the heat-spinning may be performed by means of the induction heater 8. Especially, the heat-spinning may be performed when the spinning is performed at a low spinning RPM such that a more efficient spinning effect may be expected in the night wash mode course or the silent course. Such an effect will not be realized in the conventional laundry machine. In addition, the output of the induction hater may be increased at a low spinning RPM relatively more, because the instantaneous power at the low spinning RPM may be relatively low.

The induction heater in this embodiment may control the output by means of an inverter, different from the sheath heater. Accordingly, substantially linear output control may be facilitated such that the instantaneous power variation, especially, the instantaneous power variation of the motor may be sensed immediately to control the output of the induction heater in the maximum allowable range, if necessary.

It means that the heating time is reduced and that the entire time taken by the washing or the drying may be reduced only to be more economical.

The present application of Korean Patent No. 10-2017-0101333 (hereinafter, "the cited application") discloses a laundry machine including an induction heater. Accordingly, the technical features disclosed in the cited application may be applied to the embodiment of the present disclosure, far as not exclusive and contrary to the present disclosure. Especially, the induction heater structure or the mounting structure and the coolant supply structure may be applied to the embodiment of the present disclosure equivalently.

The drum, the clothes and the air inside the tub and the drum may be heated by the induction heater. Of course, the water contained in and discharged from the clothes may be heated. Accordingly, the air inside the tub and the drum may become high-temperature humid air. The humid environment after the spinning may be maintained as it is. To prevent that, a coolant may be supplied to the inner surface of the tub.

Specifically, the coolant may flow along the rear surface or lateral surface of the tub so as to condense moisture from the high-temperature humid air. The condensed water may be discharged from the tub, together with the water collected from the clothes during the spinning.

The coolant valve may be periodically or intermittently open during the heat-spinning to remove moisture from the air and perform the heat-spinning more effectively. Also, the high-temperature humid environment after the spinning may be changed into a low-temperature dry environment easily. Such the coolant might cause an error in the sensing of the temperature sensor. Accordingly, the temperature sensor may be provided in a front lower area of the tub, because the coolant will contact with air on the rear surface or rear side surface of the tub to be discharged via the rear lower area of the tub.

The laundry machine according to the present embodiment may be a laundry machine having washing and drying functions. In this instance, the laundry machine may further include a duct and a fan that are provided to circulate air forcibly. Different from the conventional washing machine, the laundry machine according to the present disclosure requires no additional heater for the drying such that the overall system may become very simple. It is important in the laundry machine having the drying function to condense moisture from the humid air. Such moisture condensation may be performed in a space defined in the additional duct, not the space defined in the tub. In this instance, the wash water temperature sensor may be provided in the tub rear surface, spaced a preset distance upwardly apart from the bottom of the tub. The distance may be approximately 10 to 15 mm such that the coolant may be prevented from directly contacting with the wash water temperature sensor and then the temperature of the humid air may be effectively sensed.

The coolant may be supplied to the duct, not the tub. The moisture may be condensed from the air that is chilled when the coolant falls from an upper area in a portion of the duct that is upwardly extended from a lower area of the tub.

Such the duct and the chilling structure may facilitate the change of the high-temperature humid environment in the tub and the drum, once the heat-spinning or drying is completed, into the low-temperature dry environment.

In the laundry machine having the drying function, the drying may be performed, independent from the washing, or automatically performed after the washing.

As one example, the course selection unit 9215 may include a course configured to serially perform the washing cycle and the drying cycle. When the drying function is provided as a basic option, the user may select a washing course and a drying course from the course selection unit 9215 and the drying option unit 9216. Once the selected course is completed, the drying may be automatically performed. Accordingly, the washing, rinsing, spinning and drying cycles may be sequentially and automatically performed.

When the user selects only the drying option 9216, only the drying cycle may be performed.

The user may apply power to the laundry machine through a power selection unit 9214 and then load drying objects or clothes into the drum 3. After that, the user may select diverse courses and options from the course selection unit 9215 and the option unit 9211, 9212 and 9216. Hence, when the user selecting a start/pause selection unit 9213, the laundry machine may be put into operation based on the control logic selected by the user.

Figure 5:
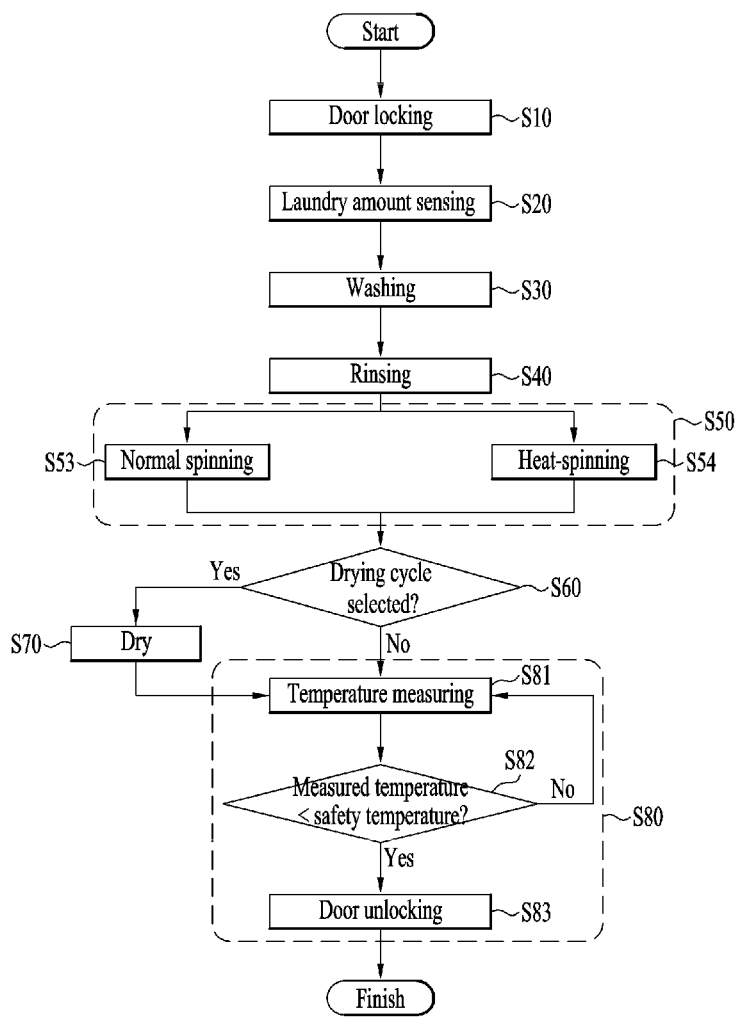
FIG. 5 is a diagram illustrating one example of a control method of a laundry machine according to one embodiment.
Figure 6:
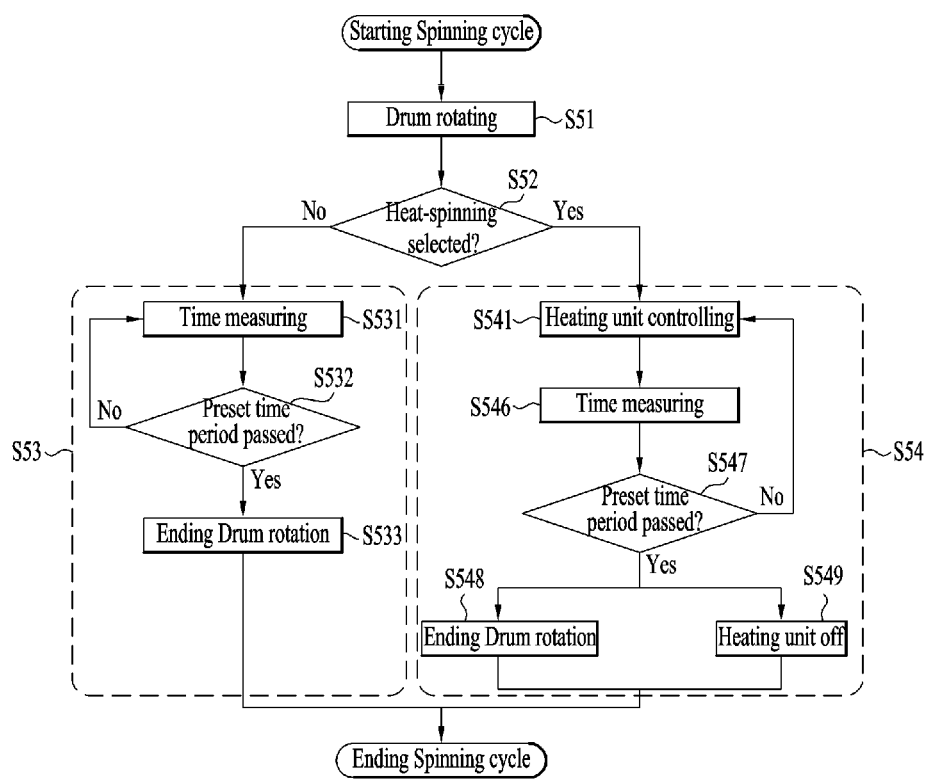
FIG. 6 is a diagram illustrating a spinning cycle according to one example of the control method.

Hereinafter, referring to FIGS. 5 and 6, a control method of the laundry machine according to one embodiment will be described in detail. FIG. 5 is one example of a control flow for a washing course including a washing or drying course. FIG. 6 is one example of a control flow for the spinning shown in FIG. 5.

When the user inputs the pause/start after completing the selection, door locking S10 may be performed first and laundry amount sensing S20 may be performed after that. Hence, washing S30 and rinsing S40 may be performed based on the sensed laundry amount.

When the user selects the washing course, spinning S50 may be performed after the rinsing S40. In other words, the drum may be rotated at a high speed and moisture may be removed from the laundry. Normal spinning S53 or heat-spinning S54 may be performed based on the user's selection or non-selection (or by default).

Each of the normal spinning and the heat-spinning may include the initial spinning and the late spinning. Different from the normal spinning, the heat-spinning may be configured to heat both the drum and the laundry by means of the induction heater in the middle of the spinning cycle.

Once the user selects the heat-spinning or drying option, the spinning cycle may perform the heat-spinning. When the user selects only the washing course or the normal spinning, the spinning cycle may perform the normal spinning.

In the normal spinning S53, the maximum duration time may be preset. Accordingly, time counting S531 may be performed after the spinning starts and it may be determined whether a preset time period passes S532. After that, the drum rotation may end S533 and the spinning cycle may end.

Even in the heat-spinning S54, the maximum duration time may be preset. Accordingly, heat-spinning time counting S546 may be performed and it may be determined whether a preset time period passes S547. After that, the drum rotation may end S548 and the spinning cycle may end. The control of the heating unit, in other words, the drive of the heating unit S541 may be performed after the drum drive starts. The heating unit drive may be performed intermittently, periodically or continuously. Here, the heating unit drive may be paused once the temperature reaches the heating target temperature. When the temperature falls, the heating unit drive may be continued.

Meanwhile, in the spinning cycle, the maximum duration time may be set for each of the initial spinning and the late spinning. As the drum RPM reaches the target RPM and the drum is rotated in the late spinning, the preset late spinning time may be equal to the maximum allowed time. Here, the preset time may be variable based on the laundry amount. However, the initial spinning may be the step that tries to enter into the late spinning and the initial spinning might fail to enter into the late spinning when occasion occurs. In this instance, the initial spinning might be performed for a long time period. Once the maximum allowed initial spinning time passes, the spinning cycle may end without entering into the late spinning. Accordingly, the preset time period in F532 and S547 may be the late spinning duration time once the late spinning starts.

Meanwhile, the initial spinning may be the process of performing laundry disentangling by means of tumbling once water discharge is completed after the rinsing cycle. Through that process, the laundry distribution may be performed and the laundry eccentricity may be solved. After such the laundry distribution and the laundry eccentricity solution, a main late spinning may be performed.

In this instance, the drum heating may be performed only in the initial spinning or only in the late spinning. Alternatively, the drum heating may be performed in both the initial spinning and the late spinning.

The initial spinning may be performed by the tumbling drive in which the drum is repeatedly rotated in a clockwise and counter-clockwise directions. Accordingly, the drum heating may be controlled to be on and off during the initial spinning. In other words, only when the drum rotates, the drum may be heated. When it pauses, the drum may not be heated.

Meanwhile, the late spinning may rotate the drum at spinning RPM in one direction. Accordingly, the drum heating may be continuously performed during the late spinning. In other words, when the drum is rotated at a preset RPM or more, the drum heating may start. The drum heating may end before the drum is paused. That is a drum heating control logic that is related with the drum rotation. As one example, the drum heating may be stopped even during the late spinning by a temperature condition and the like.

Right After the completion of the spinning S50, door unlocking S83 may be performed and the operation of the laundry may end. In other words, the washing course may be completed. However, when performing the heat-spinning S50, the drum temperature and the tub temperature are likely to be high after the completion of the spinning. At this time, when the user opens the door, the heat is likely to be discharged outside and the user might feel uncomfortable or a safety accident might occur. Accordingly, the temperature inside the tub may be measured after the completion of the spinning S81 and it is determined whether the measured temperature is lower or higher than a preset temperature S82. When the measured temperature is lower than the preset temperature, the door unlocking S83 may be performed. In other words, the processor may maintain the locked state of the door by means of the door locking mechanism, when the temperature inside the tub is higher than the preset temperature.

At this time, when the measured temperature is higher than the preset temperature, the temperature may be repeatedly measured while only the drum is rotating. However, only such the drum rotating is not enough to lower the temperature such that the coolant supply mentioned above may be performed to lower the temperature inside the tub forcibly.

Meanwhile, when the drying is selected after it is determined whether the drying cycle is selected after the spinning S60, in other words, the drying is selected in the laundry machine having the washing and drying functions, the drying S70 may be performed. After measuring the temperature like after completing the drying, the door unlocking may be performed.

The induction heater may be driven continuously, repeatedly or intermittently in the heat-spinning S50 until the temperature sensed by the temperature sensor 95 reaches the heating target temperature.

Meanwhile, the overall driving time of the induction heater during the heat-spinning may be preset. In other words, the maximum drive time may be preset. Unless laundry dispersion is performed properly, the clothes (e.g., socks) provided in the drum might generate big eccentricity enough to increase the initial spinning time. In some specific cases, the late spinning might not be performed, because the eccentricity as prerequisite for entering into the late spinning could not be solved.

Accordingly, the driving of the induction heater may be controlled by means of the heating target temperature and the maximum drive time of the induction heater may be set so as to secure stability. The heater driving time may be set to be variable based on the amount of the laundry, in other words, the laundry amount. When there is a large amount of laundry, the maximum heater drive time may be set to increase. However, the heating target temperature is irrelevant to the laundry amount and it may be set based on the washing course.

The driving of the induction heater may be completed once the temperature reaches the heating target temperature and the temperature inside the tub may go down after that. Accordingly, when the temperature do down to a predetermined temperature, the drive of the induction heater may restart. The overheat may be prevented and the sufficient heating may be performed at the same time.

It is not easy to dry the drying objects sufficiently through the spinning and the heat-spinning. When high-temperature heating is performed in a space that is substantially closed tight, the evaporated moisture will still remain in the space. Because of that, the dehydration performance in the heat-spinning is better than the dehydration performance in the normal spinning. However, it cannot be called "drying". Specifically, when drying performed serially after the spinning, the spinning may be the heat-spinning, not the normal spinning.

That is because the tub, the drum and the drying object are in the heated state during the heat-spinning. Accordingly, it is more effective in enhancing the drying performance to perform the drying after performing the heating during the spinning than perform the heating not until performing the drying.

When a course including drying is selected through the course selection unit or when drying is selected through the drying option unit after a washing course is selected through the course selection unit, the heat-spinning may be performed. In other words, even unless the heat-spinning option unit is selected additionally, the heat-spinning may be performed in the spinning by default. Here, the heating target temperature may be set based on the current selected course or irrelevant to the selected course.

Meanwhile, it is conventional that the drying time is longer than the spinning time. Since a preliminary drying is performed during the heat-spinning, the overall drying time may be reduced. In addition, when the drying is completed, the temperature inside the tub may become high and the user cannot open the door immediately. At this time, cold air circulation and/or coolant supply may chill the tub inside enough to facilitate the door open. However, it takes an additional time to chill the door in this instance.

Accordingly, the heating target temperature in the drying may be equal to or lower than the target temperature in the heat-spinning. As one example, the heating target temperature during the drying may be equal to a preset temperature that allows door open.

When the washing and the drying are performed in the night mode course, the heat-spinning may be performed, regardless of the heat-spinning option. At this time, RPM may be relatively low during the heat-spinning and a heating target temperature may be relatively high. As one example, the heating target temperature may be 60° C. The door-open allowing temperature may be 50° C. Once the heat-spinning is completed, the induction heater is driven, together with the air circulation and the coolant supply, to perform the drying. In this instance, a heating target temperature in the drying may be equal to the door-open allowing temperature.

In addition, when the drying is performed in the normal washing course, the spinning may be performed at a relatively high RPM until a heating target temperature of approximately 70° C. Even in this instance, the heating target temperature during the drying may be equal to the door-open allowing temperature.

Accordingly, the door may be open right after the drying is complete. As the drying is performed at a relatively low temperature, fabric deformation or damage may be minimized.

Figure 7:
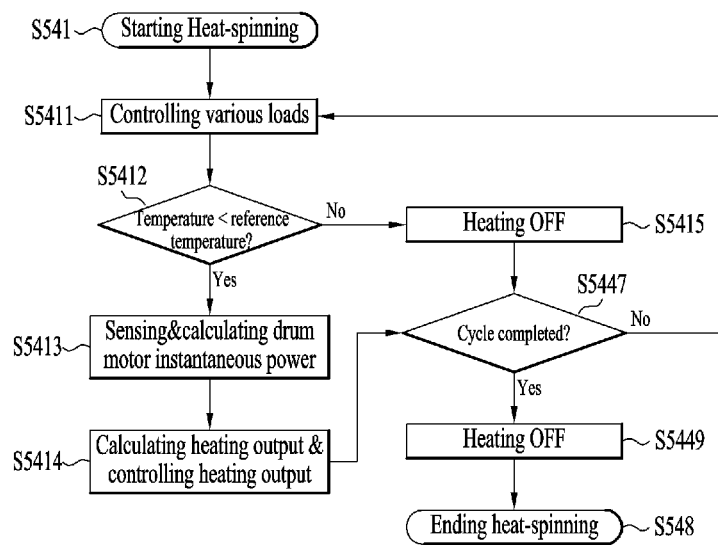
FIG. 7 is a diagram illustrating specific steps that are provided in a heater controlling step of the spinning cycle shown in FIGS. 5 and 6.

Hereinafter, referring to FIG. 7, the control flow of the induction heater during the heat-spinning will be described in detail. The flow chart illustrated herewith is specified and detailed illustration of the heat-spinning S54 shown in FIGS. 5 and 6.

Once the heat-spinning cycle S54 starts, the drum may be rotated and the induction heater may be also driven S541. A controlling step S5411 may be performed at a proper point of time to control not only the motor and the induction heater but also the other loads including the coolant valve and the water discharge pump.

The drive of the induction heater may be performed until the heating target temperature. In other words, it is continuously and repeatedly determined during the heat-spinning whether to reach the heat target temperature S5412.

When the temperature reaches the heating target temperature, the drive of the induction heater may pause S5415. Such the drive pause of the induction heater may not mean the completion of the heat-spinning cycle. That is because it may be determined whether the heat-spinning cycle is completed based on various conditions S547. As one example, it may be determined whether the target time period of the heat-spinning passes after the pause of the induction heater S5415. When the condition is satisfied, the drive of the induction heater may be finally ended and the drum rotation may be ended, only to complete the heat-spinning S548.

Unless the heat-spinning target time passes, various loads controlling S5411 may be performed and it may be determined again whether to reach the target temperature.

Unless the temperature reaches the heating target temperature after the drive of the induction heater, instantaneous power calculating S5413 may be performed.

An initial output value of the induction heater may be preset and the output value of the induction heater may be variable based on the calculated instantaneous power. In other words, a new output value of the induction heater may be calculated based on the instantaneous power value and the output of the induction heater may be controlled based on the currently calculated output of the induction heater S5414. When RPM is low with a good laundry distribution in the current heat-spinning, a low instantaneous power value may be calculated. Accordingly, the output of the induction heater may be controlled to have a higher output.

Such temperature determining S5412, the instantaneous power calculating S5413, the induction heater output variation controlling S5414 may be repeatedly performed during the heat-spinning. Here, when the heating target temperature is reached during the heat-spinning, the induction heater may be temporarily paused.

A reference temperature for pausing the induction heater after driving may be different from a reference temperature for re-driving the induction heater after pausing. In other words, a reference temperature in S5414 may be variable based on the state of the induction heater (e.g., based on the induction heater being driving or pausing). As one example, when the heating target temperature is 70° C., the temperature may rise to 70° C during the drive of the induction heater and the induction heater may then pause. When the temperature reaches 65° C. during the pause of the induction heater, the induction heater may be re-driven. The driving, pausing and re-driving of the induction heater may be repeated during the heat-spinning like the output variation of the induction heater.

In this embodiment, heating is performed in the outer circumferential surface of the drum by means of the induction heater. In other words, the induction heater heats the outer circumferential surface of the drum, not heated air or circulation of heated air. Accordingly, a specific component, not the entire system (e.g., only the drum) may be heated by using the induction heater. The configuration of the tub, the bearing housing, the shaft, the bearing and the like may be heated as least as possible during the driving of the heater such that heat resistance deterioration of components may be prevented. Especially, the drum may be made of stainless steel such that it may have a high heat resistance. Even the drum is heated at a low spinning RPM with a relatively high output, no durability and reliability deterioration may occur. Especially, the output of the induction heater may be variable based on the amount of the instantaneous power so as to use the maximum output of the induction heater in real time.

Specifically, when the eccentricity of the laundry is small, a larger output of the induction heater may be used and that may be very efficient. When the spinning is performed at a low RPM late at night, the output of the induction heater may be enhanced enough to expect a very effective spinning performance. In addition, effective spinning performance may be expected for a shorter time period or at a lower spinning RPM than the normal spinning. As a result, the drying time and the drying energy reduction effect may be expected when the drying is performed after that.

In the above-noted embodiment, the spinning performance and the drying performance may be enhanced by varying the output of the induction heater based on the instantaneous power amount, especially, at the low RPM.

Hereinafter, one embodiment will be described in detail that may vary the amount of the heat provided by the induction heater based on the heating target temperature that is variable based on the RPM in the heat-spinning. In this embodiment, the spinning performance and the drying performance at RPM may be expected to be enhanced, similar to the above-noted embodiment.

Figure 8:
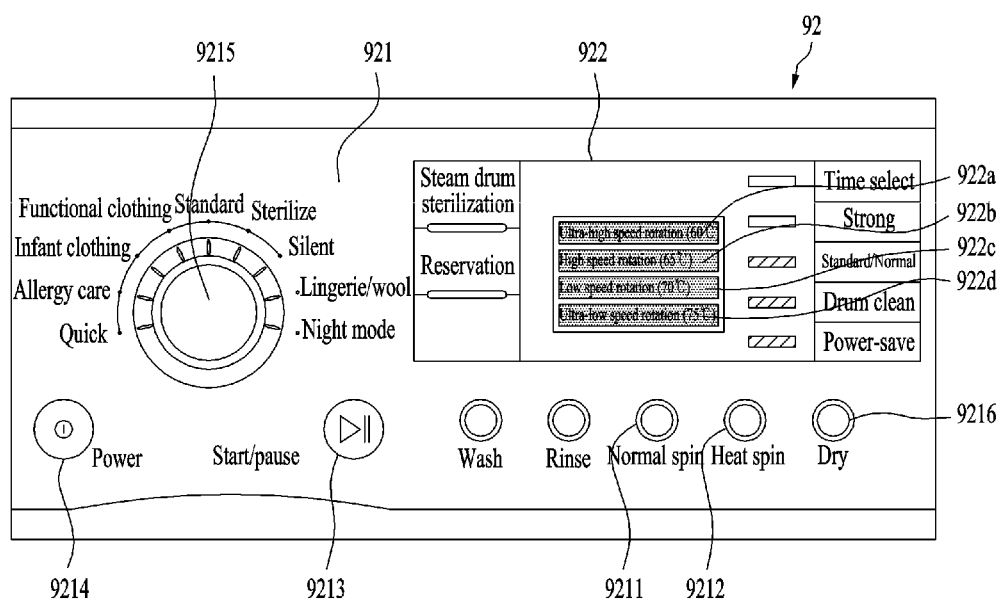
FIG. 8 is a diagram illustrating one example of a control panel provided in a laundry machine according to another embodiment.

FIG. 8 illustrates one example of a front side provided in the control panel 92 including the manipulation unit 921 and the display unit 922, in other words, a front surface of a user interface 92. Basically, this embodiment may be similar to the above-noted embodiment (see FIG. 4) and the same features or characteristics will be omitted accordingly.

The user may select one specific course via the course selection unit 9212 and also select the heat-spinning option unit 9212 to enhance the spinning efficiency. Here, the user may select the heat-spinning option unit 9212 just to perform heating during the spinning of the elected specific course. However, the processor may set the heating target temperature by the drive of the induction heater to be different based on the spinning target RPM of the selected specific course.

Specifically, as the preset spinning target RPM is higher, the heating target temperature may be set to be lower. In the reverse, as the spinning target RPM is lower, the heating target temperature may be set to be higher.

As mentioned above, the spinning target RPM may be preset in a specific course, which is selected through the course selection unit 9215, by default. Such the preset spinning target RPM may be preset after changed via the normal spinning option unit 9211. Accordingly, once the heat-spinning is selected, the heating target temperature may be set based on the current spinning target RPM preset finally.

The spinning target RPM may include a plurality of steps 922*a*, 922*b*, 9322*c* and 922*d*. as one example, those steps may be provided as 800 RPM, 1000 RPM, 1200 RPM and 1400 RPM. The heating target temperatures may be preset to be 75° C., 70° C., 65° C. and 60° Cfor those steps, respectively. In FIG. 8, the spinning target RPM steps and the respective heating target temperatures set for them are shown. The spinning target RPM may be displayed as RPM value or qualitative expression (e.g., an ultra-high speed, a high speed, a low speed and an ultra-low speed).

When the display unit 922 is realized as a touch display, the user may select the spinning target RPM and the heating target temperature through the display unit 922. Here, when a specific heating option through the heating spinning option unit 9212 is selected, the selected spinning target RPM and heating target temperature may be displayed on the display unit 922.

In this instance, such the steps may be classified into more specific ones or three ones or less. When the spinning target RPM is classified into three steps as occasion rises, the heating target temperature may be set to have a difference of 10° C.

When needing to perform washing late at night or in quite a silent state, the user may select the silent course or the night mode course through the course selection unit 9215. In such the courses, the moving rate of the drum (or the rate of the time when the drum is substantially rotating in a drum operation section) may be lowered to minimize noise during the washing. Here, the duration of the washing may be increased in comparison with the other courses so as to secure the washing performance.

While the washing performance may be secured in such the night mote course or the silent course, it is difficult to secure spinning performance. Since noise and vibration are likely to occur during the spinning at a high rotation number, the spinning target RPM is set to be low in such the courses. When it is approximately 1200 RPM or more in the normal courses, the spinning target RPM may be approximately 800 RPM in such the courses.

Accordingly, much moisture remains in the clothes after the spinning such that the user may determine that sufficient spinning is not performed.

However, according to this embodiment, the heating target temperature may be even raised when the spinning is performed at a low target RPM such that the spinning performance may be enhanced by the raised temperature. In other words, the moisture discharge promoted by the moisture evaporation may be performed as well as the moisture discharge promoted by the centrifugal force.

A control method of the laundry machine according to this embodiment may be similar to the control method shown in FIGS. 5 and 6, and repeated description is omitted accordingly.

Figure 9:
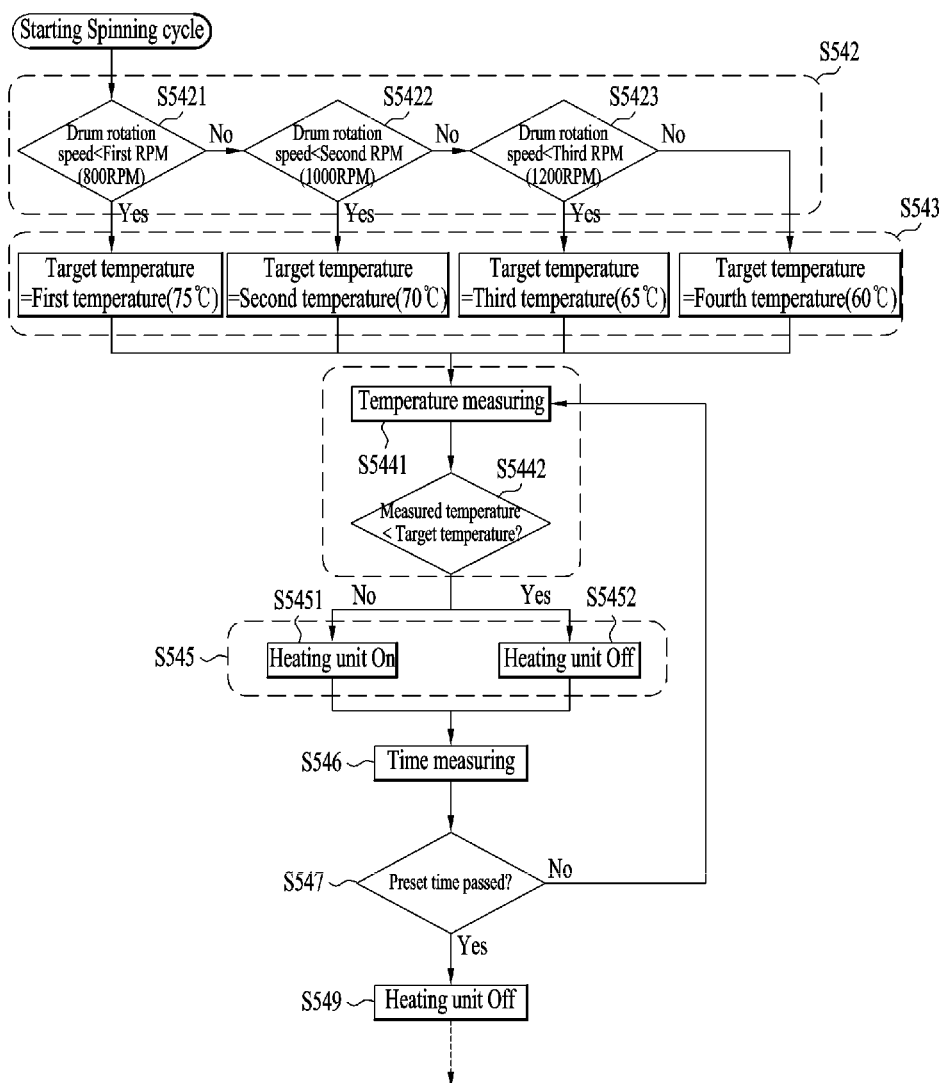
FIG. 9 is a diagram illustrating one example of a control method of a laundry machine according to another embodiment.

Hereinafter, referring to FIG. 9, the relation between the target spinning RPM and the heating target temperature will be described in detail.

Once the spinning cycle starts, it may be determined whether to perform the heat-spinning (S542). A target spinning RPM and a heating target temperature may be determined in this step. A current target spinning RPM may be detected and the heating target temperature may be machined to the respective current target spinning RPMs to set the target spinning RPM.

Once the drum rotation and the induction heater driving S541 start, S542 may be performed.

The target spinning RPM may be classified into 4 stages as one example. A first RPM may be 800 RPM or less and a second RPM may be 1000 RPM or less. A third RPM may be 1200 RPM or less and a fourth RPM may be more than 1200 RPM. The heating target temperature may be set based on the current target spinning RPMs S543. As one example, the heating target temperature may be set to be 75° C., 70° C., 65° C. and 60° C. for the four stages, respectively. In other words, as the target spinning RPM become lower, the heating target temperature may be set to be higher.

When the current RPM reaches a predetermined RPM or after a predetermined time period as soon as or after the drum is driven, the induction heater may be driven to perform the heat-spinning.

Temperature measuring S5441 may be performed during the heat-spinning and it is checked whether the measured temperature reaches a heating target temperature. When the measured current temperature reaches the heating target temperature, the drive of the induction heater may be paused S5452. Unless it reaches the heating target temperature, the drive of the induction heater may be maintained S5451.

The drive control of the induction heater may be performed until the end of the heat-spinning and the end of the heat-spinning may be performed on a time basis. In other words, it may be determined whether a preset time period passes S547 and the drive of the induction heater may finally end after the preset time period, only to complete the heat-spinning.

The above embodiment may include a step S543 of setting the heating target temperature to be higher as the preset spinning target RPM becomes lower based on the step of setting the spinning target RPM S542 and the preset spinning target RPM. In addition, the embodiment may include a step of performing the heat-spinning based on the set spinning target RPM and the heating target temperature.

According to this embodiment, the heating may be performed by heating the outer circumferential surface of the drum by means of the induction heater. Specifically, the outer circumferential surface of the drum may be heated by using the induction heater, not the heated-air or the heated-air circulation, such that a specific configuration (e.g., only the drum), not the entire system, may be heated. Accordingly, the heating of the configuration that consists of the tub, the bearing housing, the shaft and the bearing may be minimized when the induction heater is driving. Heat durability of those configurations may not be deteriorated. Especially, the drum may be fabricated of stainless steel such that it may be more durable in heat. Even though the drum is heated even to a high temperature at a relatively low spinning RPM, the drum will have no durability and reliability deterioration. Accordingly, an effect of the drying time and the drying energy reduction may be expected in the following drying, when the drying is set to be performed.

As described above, the embodiment discloses the variation of the induction heater output and the variation of the heating target temperature during the heat-spinning.

Hereinafter, one embodiment will be described that may allow the user to easily select diverse drying conditions and perform effective drying based on the selected drying condition. Of course, the above-noted heat-spinning characteristics may be applied to this embodiment and the characteristics of the above-noted embodiment may be applied to this embodiment equally and similarly.

In the conventional dryer having the washing function or the dryer having the washing function, the washing is a main function and the drying may be an optional function. Accordingly, when the user selects of the washing courses via the course selection unit 9215, washing may be performed and completed based on the selected washing course. The washing course may be implemented to automatically perform and complete basic cycles configured of washing, rinsing and spinning cycles that are preset.

To perform the drying, the user may select a drying option 9216 of FIG. 4 after the washing course so as to perform the drying. Hence, the user may select one specific washing course by means of the course selection unit 9215 shown in FIG. 4 and select the drying option 9216. Once the user selects the specific washing course, the selected washing course may be performed and then the drying may be automatically performed after that.

Accordingly, the conventional laundry machine (e.g., the dryer having the washing function) may not provide diverse drying conditions. Specifically, the user may not select one of the diverse drying conditions.

As one example, the user may wish to perform natural drying after the washing. In this instance, a high-efficiency natural drying may be required so as to promote the natural drying. The user may wish to perform the washing and the drying at midnight and wear the clothes in the next morning as they are, without additional drying. If then, the washing and the drying may be performed late at night such that vibration and noise can be minimized, together with an effective drying effect. In addition, the user may wish to the washing and the drying to be automatically performed in normal conditions.

To meet such the user's drying requirements effectively and enhance use convenience, this embodiment may provide the course selection unit 9215 to include a wash-drying course. The processor may control the operation of the laundry machine to perform and complete the course based on a specific wash-drying course selected by the user.

The course selection unit 9215 may basically include a plurality of washing courses 9215a. Such washing courses may perform washing, rinsing and spinning sequentially and automatically. Here, specific control variables for the respective washing courses may be set to be different (e.g., one or more of the wash water amount, the wash water temperature, the washing time, the rinsing cycle frequency, presence of steam supply, the washing time and a washing degree (a mechanical power difference), and a spinning target RPM).

In this embodiment, the user may select the wash-drying course via the course selection unit 9215 and the wash-drying course may be performed by default. The wash-drying course may be configured to perform the heat-spinning by default and the heat-spinning is performed to heat the drum and perform the spinning together by driving the induction heater during the drum rotation.

The wash-drying course may include a course that is configured to perform the drying after the spinning after the spinning. Especially, when only the wash-drying course is selected from the course selection unit 9215, a course may be provided to perform the heat-spinning by default and then the drying.

Accordingly, the user may select only one course from the course selection unit, without additionally selecting options, so as to perform the washing and drying automatically. The user is able to wear the clothes right after the washing and drying in the completion of the laundry machine operation.

A plurality of wash-drying courses having the drying cycle may be provided. In other words, the user is able to select diverse drying conditions. As one example, the plurality of the wash-drying courses may be provided based on the target RPM of the drum. The courses may include a course having a relatively low drum target RPM in the spinning (or a first wash-drying course and a course having a relatively high drum target RPM (or a second wash-drying course.

In the first wash-drying course, the drum target RPM in the spinning may be low such that it may be configured to perform the washing and the drying in a silent environment or late at night. The second wash-drying course may perform the washing and the drying in a normal environment.

As the drum target RPM is varied, the output variation of the induction heater and/or the variation of the heating target facilitated by using the induction heater according to the above-noted embodiments may be applied equally.

In other words, the moisture separated by the centrifugal force may be reduced because the drum RPM is low in the spinning but the satisfactory spinning performance may be finally gained by increasing the amount of the heat, which will affect even the drying function set to be performed after that.

The user may select a night wash-drying course as one example of the first wash-drying course 9215b. in this instance, as the drying may be performed after the heat-spinning performed at the relatively low RPM, the washing and drying with low-noise and low-vibration may be performed. Accordingly, when selecting the washing and drying late at night to immediately wear the washed and dried clothes in the morning, the user may select the first wash-drying course.

The user may also select a normal wash-drying course as one example of the second wash-drying course 9215c. In this instance, the drying may be performed after the heat-spinning performed at a relatively high RPM such that the drying time reduction and the effective drying may be facilitated. Accordingly, when wishing to perform a quick washing and drying in the morning or afternoon, the user may select the second wash-drying course.

The duration of the first wash-drying course may be relatively longer than that of the second wash-drying course. Of course, control logics for the drying courses after the heat-spinning may be equal to each other. As one example, the drum drive pattern or target RPMs, the heating target temperatures and the drying completion point conditions may be equal in the drying courses. Accordingly, it is expected that the amount of the moisture remaining after the heat-spinning is more in the first wash-drying course than the second wash-drying course and it can be said that the duration of the second wash-drying course is relatively shorter.

However, the wash-drying may be performed late at night, the time is relatively less restricted. That is because the low-noise and low-vibration may be more important requirement late at night than the duration time reduction. In this instance, the same-level drying performance may be provided by increasing the heat amount and/or the heating time during the heat-drying and the drying time.

The processor may control the output of the induction heater during the heat-spinning to be variable when performing the first wash-drying course. As one example, the output of the induction heater may be controlled to be variable based on the output of the instantaneous power output unit. The output variation of the induction heater may be performed only in the first wash-drying course. As another example, the output variation may be performed even in the second wash-drying course.

The processor may control the heating target temperature raised by the drive of the induction heater in the first wash-drying course to be higher than the heating target temperature in the second wash-drying course. In other words, the processor may control the heat amount to be increased more.

Meanwhile, the wash-drying course that is selectable from the course selection unit may include one washOdryng course configured to perform the drying by default and another wash-drying course configured to perform no drying. The latter wash-drying course may be a course configured to perform and end the heat-spinning by default. The course may end after the heat-spinning, not after the normal spinning, such that it may perform highly-efficient spinning. In other words, compared with the normal spinning, the drying effect facilitated by the heat-spinning may reduce the water content noticeably such that quick drying can be gained in the latter wash-drying course, in case of the natural drying.

The wash-drying course configured to end after the heat-spinning may be a third wash-drying course 9215d. As one example, it may be a natural wash-drying course.

Meanwhile, heating target temperatures may be different from each other in the heat-spinning in the three wash-drying courses mentioned above. Specifically, a heating target temperature in the heat-spinning of the first wash-drying course may be set to be the highest and a heating target temperature in the heat-spinning of the third wash-drying course may be set to be the lowest. Meanwhile, a target RPM in the heat-spinning of the third wash-drying course may be set to be the highest and a target RPM in the heat-spinning of the first wash-drying course may be set to be the lowest. A range of the target RPMs may be approximately 800~1400 RPM and a range of the heating target temperature in the heat-spinning may be approximately 60~75° C.

The plurality of the wash-drying courses may be provided and the target RPMs and the heating target temperatures may be set to be different in the respective courses, such that the user can easily select one of the diverse wash-drying conditions as occasion occurs.

Meanwhile, this embodiment may also provide the spinning options 9211 and 9212. As one example, the user may select the normal spinning option 9211 and change a spinning target RPM of the selected washing course. Here, a range of the variable target RPMs or variable target RPMs may be changed based on a specific one of the washing courses/ as one example, the user may select the heat-spinning option 9212 and change the spinning of the selected washing course into the heat-spinning. Here, the heat-spinning selection may be limited based on a specific washing course. As one example, the heat-spinning selection may be limited in the functional clothing course or the wool course.

In addition, the heat-spinning of the wash-drying course may be performed by default. In this instance, as the user selects the heat-spinning option 9212, the heat-spinning may be excluded. However, the heat-spinning may be performed in the wash-drying course and it may be the course that may provide the optical spinning and drying. Accordingly, it may be noticed to the user and displayed on a display of the user interface by letters that the heat-spinning may be performed in the wash-drying course in the wash-drying course by default such that the heat-spinning option may be excluded from the selection. Here, the heat-spinning option may be selected even in the wash-drying course and then excluded from the selection.

Meanwhile, the wash-drying course may perform the heat-spinning by default as mentioned above. Here, the heat-spinning option 9212 may be the option selection unit for changing the heat-spinning condition, not for excluding the performance of the heat-spinning.

Figure 10:
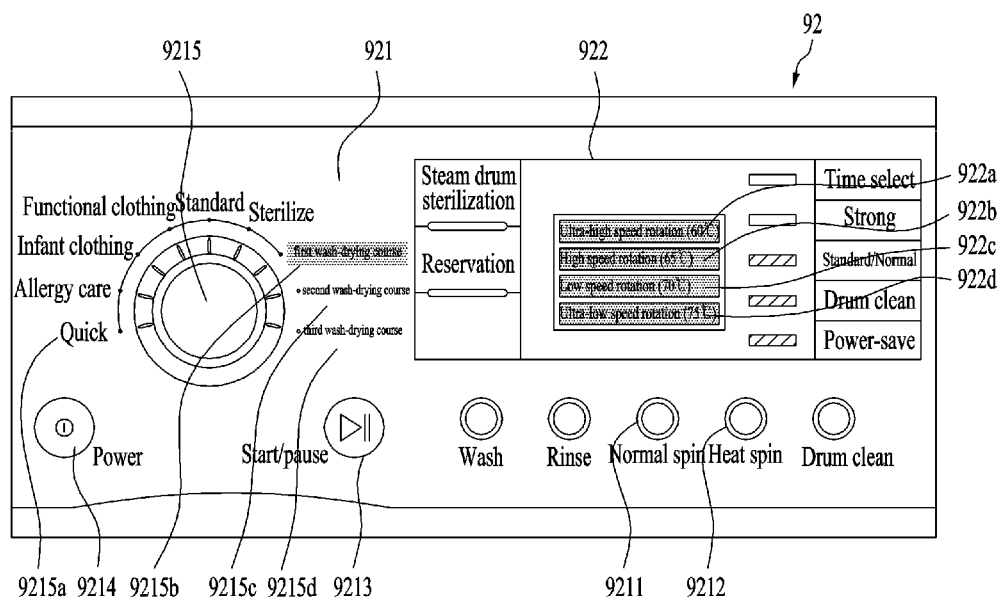
FIGS. 10 and 11 are a diagram illustrating one example of a control panel provided in a laundry machine according to a further embodiment.

FIG. 10 illustrates one example that the normal wash-drying course is selected from the wash-drying courses. As the heat-spinning is performed by default, the user may change the drum RPM condition and the target temperature condition in the heat-spinning through the heat-spinning option 9212. Because low-noise and low-vibration is likely to be required during the normal wash-drying course if necessary. Such a case is likely to occur even when the user is listening to music or studying while using the laundry machine. The characteristics of the letters displayed on the display may be equal to what is described, referring to FIG. 8.

Figure 11:
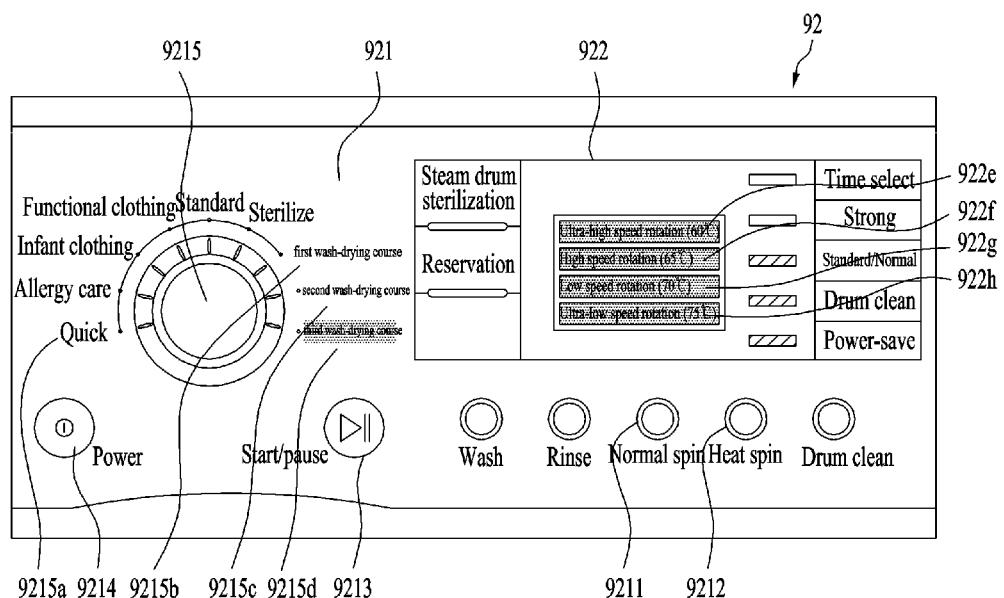

FIG. 11 illustrates one example that the natural wash-drying course is selected from the wash-drying courses. As the heat-spinning is performed by default in the natural wash-drying course, the user may change the drum RPM condition and the target temperature condition in the heat-spinning by means of the heat-spinning option 9212. That is because the low-noise and the-vibration is likely to be required during the natural wash-drying course. That is highly likely to occur in case the user is listening to music or studying while using the laundry machine. The characteristics of the letters displayed on the display may be equal to what is described, referring to FIG. 8.

However, the drum RPM condition and the target temperature condition change may be restricted in the heat-spinning of the night wash-drying course, different from the normal wash-drying course and the natural wash-drying course. In other words, when the user selecting the heat-spinning option, the restriction of the selection may be noticed to the user via a buzzer or a display. That is to prevent a loud noise from occurring at night because of an error in advance, because the night wash-drying course basically requires the low-noise and the low-vibration in the night wash-drying course. If wishing to a high spinning RPM in the night wash-drying course, the user may select the normal wash-drying course or the normal wash-drying course together with the heat-spinning option, not the night wash-drying course.

Accordingly, the user may easily and intuitively use the user interface of the laundry machine based on the relation of the selection inclusion and the selection exclusion between the course selection unit and the option selection unit.

Figure 12:
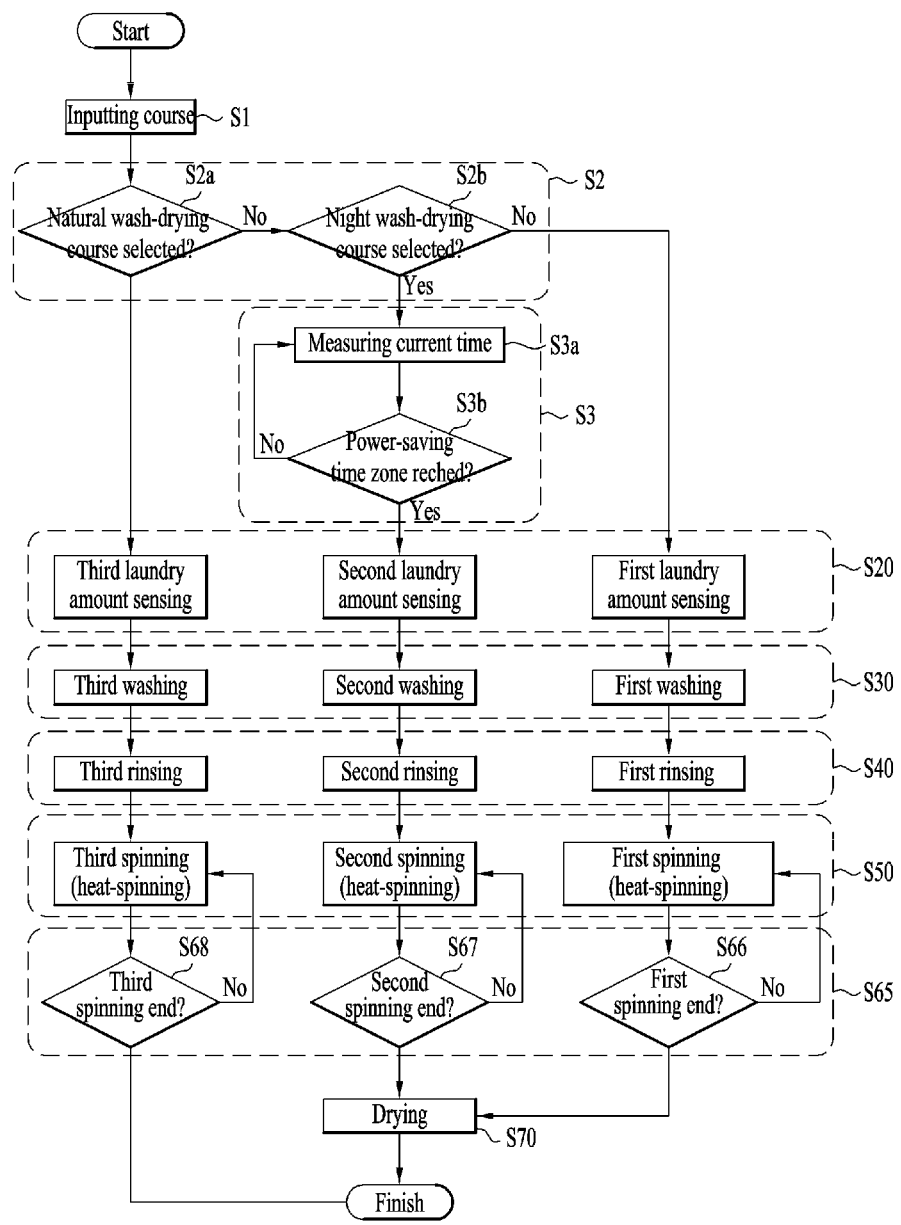
FIG. 12 is a diagram illustrating one example of a control method of a laundry machine according to a further embodiment.

Hereinafter, referring to FIG. 12, a control method of the laundry machine according to one embodiment will be described in detail. The control method according to this embodiment may be similar to the control method mentioned above referring to FIG. 5.

When the normal washing course is selected from the course selection unit, the control method shown in FIG. 5 may be performed. When the wash-drying course is selected from the course selection unit, the control method shown in FIG. 12 may be performed.

Once the course is input to the course selection unit S1, it may be determined which course is input S2. It may be determined whether the natural wash-drying course S2*a* or the night wash-drying course S2*b* is selected. Unless both courses are not selected, it may be determined that the normal wash-drying course is selected.

When the corresponding course is determined, laundry amount sensing S20, washing S30, rinsing S40 and spinning S50 may be performed based on the selected course.

In case of the night wash-drying course, a standby step S3 before the laundry amount sensing S20 may be performed. Specifically, in the course courses, the laundry amount sensing may start right after the selected course is determined in the other courses. however, in the night wash-drying course, the current time may be measured S3*a* and the measured time may be compared with a power-saving time zone S3*b*. when the current time reaches the power-saving time zone, the laundry amount sensing S20 may finally start to perform the course.

As mentioned above, the wash-drying course may perform the heat-spinning in the spinning S50 by default. However, the target temperature and the spinning RPM in the heat-spinning may be variable via the heat-spinning option. Accordingly, all of the conditions selected from the course selection unit and the heat-spinning option may be reflected in the heat-spinning. Hence, the heat-spinning may be performed at the final target temperature and the spinning RPM.

In addition, the heat-spinning may be excluded from all or some period of the wash-drying course by means of the heat-spinning option. Accordingly, it may be determined in the spinning S50 whether to perform the heat-spinning and the heat-spinning or the normal spinning may be performed based on the result of the determination.

In case of the natural wash-drying course after the spinning, the course may end. In case of the normal wash-drying course or the night wash-drying course, the course may end after the drying S70.

Accordingly, the wash-drying course as well as the normal washing course may be selected from the course selection unit. Once the normal washing course is selected. The performing of the heat-spinning may be selected via the option unit. The wash-drying course may be selected and then the heat-spinning option may be then changed.

Accordingly, the diverse washing and wash-drying courses may be provided and diversity may be provided in the spinning performance and the drying performance. Accordingly, the user may select what he or she wants intuitively and easily and the laundry machine may perform the operation based on the user's selection.

Figure 13:
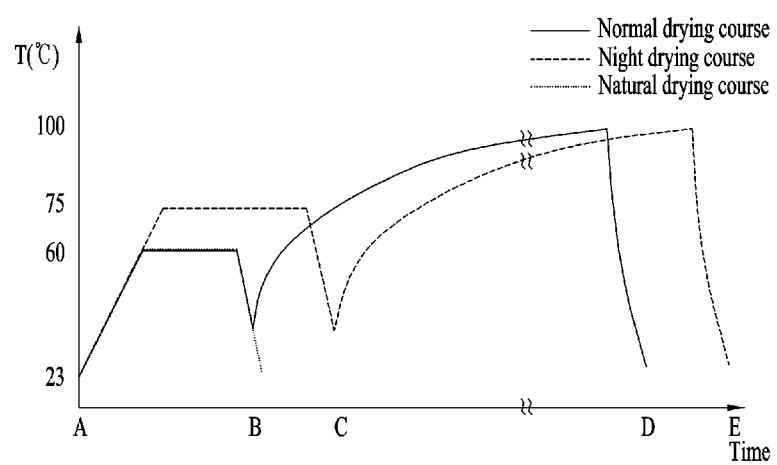
FIG. 13 is a graph illustrating to compare a heating target temperature and a drying time with each other based on a washing/drying course according to a further embodiment.

FIG. 13 illustrates the relation between the heating target temperatures and the drying times in the wash-drying courses.

As shown in the drawing, only the heat-spinning may be performed in AB section in the natural wash-drying course. At this time, the heating target temperature may be relatively the lowest (e.g., 60° C.). In this instance, the heat-spinning may be performed at the highest RPM.

The heat-spinning of the normal wash-drying course may be equal to that of the natural wash-drying course. However, the drying may be performed after the heat-spinning.

The heating target temperature in the heat-spinning of the night drying course may be relatively high (e.g., 75° C.), compared with the heat-spinning processes of the other courses. The heat-spinning duration may be relatively longer than the durations of the other courses. The drying may be performed after the heat-spinning.

The drying of the night wash-drying courses may be equal to that of the normal wash-drying course. As the heat-spinning takes a long time, the overall spinning and drying time including the drying may increase. The heating target temperatures are equal such that the time taken to complete the drying process may be equal in the two courses, when the two courses have the same laundry amount and the same water content.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A laundry machine comprising:
   a tub;
   a drum that is rotatably mounted in the tub and that is configured to hold laundry;
   an induction heater that is located on the tub and configured to heat the drum;
   a motor that is configured to rotatably drive the drum;
   a user interface comprising:
      a course selection unit that is configured to select one of a plurality of courses; and
      an option selection unit that is configured to select an option that corresponds to the selected one of the plurality of courses; and
   a processor that is configured to control a spinning speed of the drum and that is configured to drive the induction heater,
   wherein the plurality of courses comprises a wash-drying course that is configured to automatically and sequentially perform a washing cycle, a rinsing cycle, a spinning cycle, and a drying cycle, the spinning cycle performing a heat-spinning operation, and
   wherein the processor is configured to control the induction heater and the spinning speed of the drum to perform the heat-spinning operation that is configured to heat the drum during the spinning cycle.

2. The laundry machine of claim 1, wherein the heat-spinning operation comprises different target spinning speeds of the drum during the spinning cycle.

3. The laundry machine of claim 2, wherein a heating target temperature in the heat-spinning operation is set according to a respective target spinning speed of the drum,
   wherein, based on the target spinning speed of the drum decreasing, the heating target temperature increases, and
   wherein, based on the target spinning speed of the drum increasing, the heating target temperature decreases.

4. The laundry machine of claim 3, wherein a first time period for performing a first part of the spinning cycle associated with a first target spinning speed is set to be longer than a second time period for performing a second part of the spinning cycle associated with a second target spinning speed, the first target spinning speed being lower than the second target spinning speed.

5. The laundry machine of claim 3, wherein the spinning cycle of the wash-drying course is configured to perform the heat-spinning operation based on the heating target temperature set according to the target spinning speed of the drum.

6. The laundry machine of claim 3, further comprising:
   an instantaneous power output unit configured to calculate instantaneous power of the motor for driving the drum,
   wherein the processor is configured to control output of the induction heater to vary based on output of the instantaneous power output unit.

7. The laundry machine of claim 6, wherein the instantaneous power output unit is configured to calculate the instantaneous power of the motor based on input current and voltage that are input to the motor or based on the input current that are input to the motor and AC input voltage applied to the laundry machine.

8. The laundry machine of claim 3, further comprising:
   an instantaneous power output unit configured to calculate entire instantaneous power of the laundry machine,
   wherein the processor is configured to control output of the induction heater to vary based on output of the instantaneous power output unit.

9. The laundry machine of claim 8, wherein the instantaneous power output unit is configured to calculate instantaneous power based on input AC voltage and input AC current that are applied to the laundry machine.

10. The laundry machine of claim 6, wherein the processor is configured to decrease the output of the induction heater as the output of the instantaneous power output unit increases, and
    wherein the processor is configured to increase the output of the induction heater as the output of the instantaneous power output unit decreases.

11. The laundry machine of claim 1, wherein the processor is configured to control overall driving time of the induction heater in the heat-spinning operation to be less than a preset time period, the preset time period being set based on an amount of the laundry.

12. The laundry machine of claim 1, wherein the wash-drying course is selected in the course selection unit and the heat-spinning operation is configured to perform by default without selection of the heat-spinning operation from the option selection unit.

13. The laundry machine of claim 1, wherein the option selection unit comprises an option to select, based on the wash-drying course being selected from the course selection unit, a target spinning speed and a heating target temperature of the drum for the heat-spinning operation.

14. The laundry machine of claim 1, further comprising:
    a temperature sensor that is configured to sense a temperature inside the tub, the temperature sensor disposed at a lower side of the tub.

15. The laundry machine of claim 14, further comprising:
    a door; and a door locking mechanism that is configured to maintain the door in a closed position, wherein the processor is configured to control the door locking mechanism to maintain the door in the closed position based on the temperature sensed by the temperature sensor being equal to or greater than a preset temperature.

16. A laundry machine comprising:

a tub;

a drum that is rotatably mounted in the tub and that is configured to hold laundry;

an induction heater that is located on the tub and configured to heat the drum;

a motor that is configured to rotatably drive the drum;

a user interface comprising:

a course selection unit that is configured to select one of a plurality of courses; and an option selection unit that is configured to select an option that corresponds to the selected one of the plurality of courses; and a processor that is configured to control a spinning speed of the drum and that is configured to drive the induction heater, wherein the plurality of courses comprises:

a wash-drying course that is configured to automatically and sequentially perform a first washing cycle, a first rinsing cycle, a first spinning cycle, and a drying cycle, the first spinning cycle performing a heat-spinning operation; and a normal washing course that is configured to automatically and sequentially perform a second washing cycle, a second rinsing cycle, and a second spinning cycle, the second spinning cycle performing a spinning operation and excluding driving of the induction heater in the spinning operation, and wherein the processor is configured to control the induction heater and the spinning speed of the drum to perform the heat-spinning operation that is configured to heat the drum during the first spinning cycle.

17. The laundry machine of claim 16, wherein the heat-spinning operation comprises different target spinning speeds of the drum during the first spinning cycle.

* * * * *